US012572397B2

(12) United States Patent (10) Patent No.: US 12,572,397 B2
Patro et al. (45) Date of Patent: Mar. 10, 2026

(54) REAL-TIME EVENT DATA REPORTING ON EDGE COMPUTING DEVICES

(71) Applicant: Microsoft Technology Licensing, LLC, Redmond, WA (US)

(72) Inventors: Sameer Kumar Patro, Bhubaneswar (IN); Aritra Basu, Bengaluru (IN); Arun Kumar, Greater Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 17/946,484

(22) Filed: Sep. 16, 2022

(65) Prior Publication Data

US 2024/0095101 A1 Mar. 21, 2024

(51) Int. Cl.
G06F 9/54 (2006.01)
G06F 11/34 (2006.01)
(52) U.S. Cl.
CPC .......... G06F 9/542 (2013.01); G06F 11/3495 (2013.01)
(58) Field of Classification Search
None
See application file for complete search history.

(56) References Cited

U.S. PATENT DOCUMENTS 9,378,047 B1 * 6/2016 Gould ..................... G06F 9/542
10,255,141 B2 4/2019 Park
2013/0066980 A1 * 3/2013 Vasters ................... H04L 69/40
709/206

2014/0330956 A1 * 11/2014 Telfer .................. G06F 11/3466
709/224
2015/0016249 A1 * 1/2015 Mukundan .............. H04L 12/66
370/230
2015/0331635 A1 * 11/2015 Ben-Shaul .............. G06F 3/067
711/120
2018/0359201 A1 12/2018 Rangasamy
2019/0130004 A1 5/2019 Singh

OTHER PUBLICATIONS

International Search Report and Written Opinion received for PCT Application No. PCT/US23/030760, Nov. 7, 2023, 17 pages.
International Preliminary Report on Patentability received for PCT Application No. PCT/US23/030760, Mar. 27, 2025, 11 pages.

* cited by examiner

*Primary Examiner* — Umut Onat
(74) *Attorney, Agent, or Firm* — Ray Quinney & Nebeker P.C.; Christopher K. Hallstrom

(57) ABSTRACT

A real-time event data reporting system is disclosed that makes real-time and near-real-time monitoring and reporting possible in edge devices. For example, in various instances, the real-time event data reporting system embeds services within traditional event data collectors of edge devices to obtain, organize, and publish event data for local computing devices in real time utilizing in-memory storage. Additionally, the real-time event data reporting system further processes the published event data to generate aggregated data that is persisted to a persistence storage. In this manner, the real-time reporting system efficiently and accurately provides event data reports to client devices with processed metric data in real time, or in near-real time when utilizing additional fallback safeguards. Indeed, the real-time reporting system provides a highly available, fault-tolerant, distributed, scalable, and efficient mechanism for collecting and managing various metrics from services in edge or cloud environments.

20 Claims, 11 Drawing Sheets

900

Storing A Real-Time Event Data In An Event Map 910

Publishing An Event Map In Real Time To A Distributed Queue 920

Processing The Published Event Data 930

Persisting The Processed Event Data To A Persistence Store 940

Providing The Processed Event Data For Display 950

REAL-TIME EVENT DATA REPORTING ON EDGE COMPUTING DEVICES

BACKGROUND

Recent years have seen significant hardware and software advancements in computing devices. As an example, a larger number of entities are increasingly using services offered by cloud computing systems. To improve issues that are associated with using services on cloud computing systems, some existing computer systems employ edge computing devices (e.g., a Stack Edge device) that offer these services with lower latency, increased bandwidth, and/or improved connectivity. For instance, an edge computing device (or "edge device") can provide a hardware-as-a-service (HWaaS) solution that brings the power of cloud computing systems to a local network of an entity (e.g., an on-prem network). Indeed, an edge device can provide an entity with localized processing for services requested by other computing devices operating within the local network of the entity.

SUMMARY

The disclosed systems and methods solve problems in the art by making real-time and near-real-time monitoring and reporting possible in edge devices. For example, the disclosed systems and methods provide an edge device framework for real-time or near real-time collection and management of event data metrics from local network services in a way that is efficient, highly available, fault-tolerant, distributed, and scalable.

For instance, in one or more implementations, the disclosed systems and methods embed services within traditional event data collectors of edge devices to obtain, organize, and publish event data for local computing devices in real time utilizing in-memory storage. Additionally, the disclosed systems and methods further process the published event data to generate aggregated data and persist it to a persistence storage, which enables the processed event data to be quickly provided to client devices, such as administrator devices.

As detailed below, the disclosed systems and methods provide numerous benefits over existing computer systems, such as facilitating real-time or near-real-time monitoring of local networks and systems as well as reducing the processing latency of metrics. Additionally, the disclosed systems and methods utilize a hierarchical aggregation that reduces the number of requests and enables edge device reporting when disconnected from a corresponding cloud computing system. Further, the disclosed systems and methods integrate with any service of any scale and are platform agnostic.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
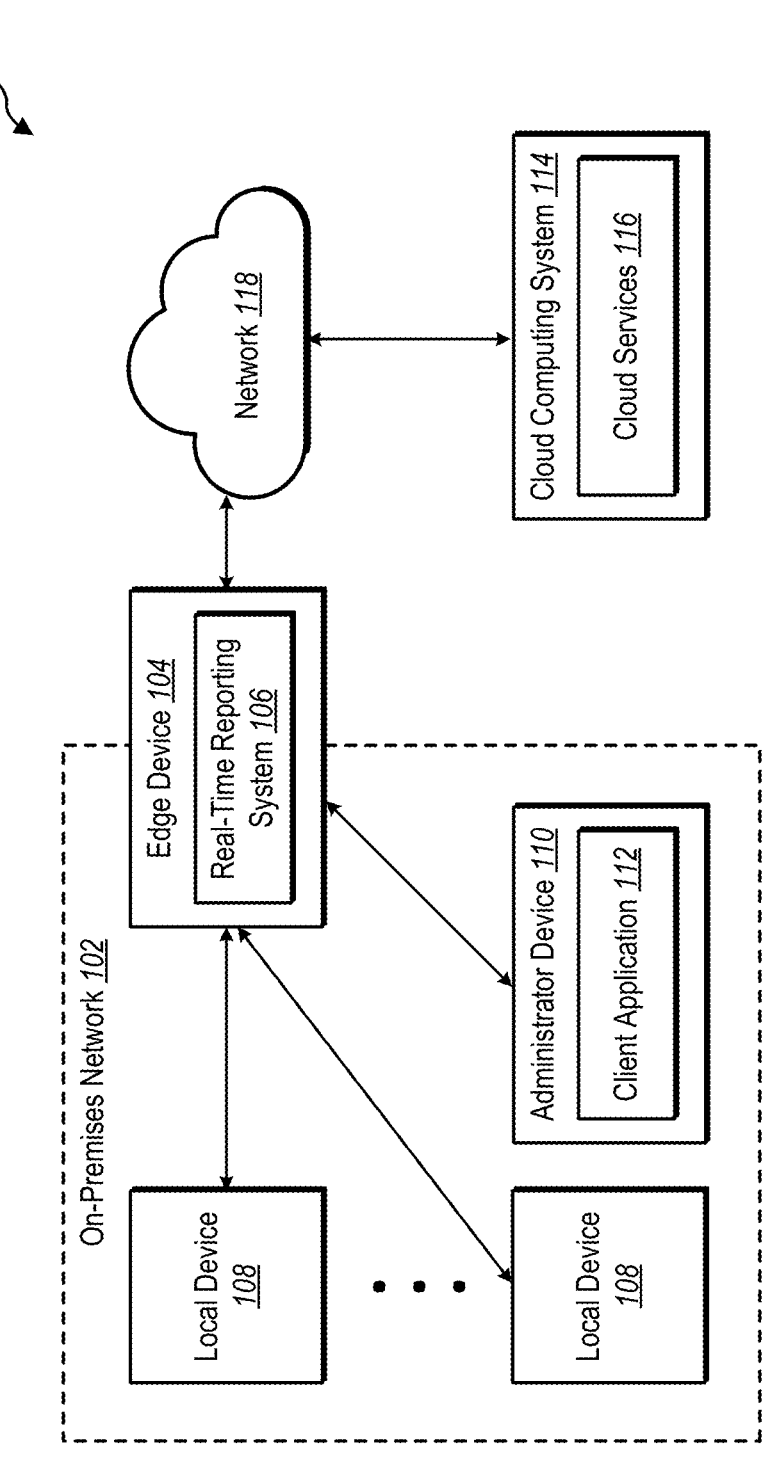
FIGS. 1A-1B illustrate a diagram of an example computing system environment where a real-time event data reporting system is implemented in accordance with one or more implementations.

Implementations of the present disclosure provide benefits and/or solve one or more of the foregoing or other problems in the art with systems, computer-readable media, and methods utilizing a real-time event data reporting system that makes real-time and near-real-time monitoring and reporting possible in edge devices. For example, in various implementations, the real-time event data reporting system (or "real-time reporting system") embeds services within traditional event data collectors of edge devices to obtain, organize, and publish event data for local computing devices in real time utilizing in-memory storage.

As provided in this document, the real-time reporting system provides a real-time monitoring framework that facilitates a fault-tolerant, highly-efficient approach for collecting, processing, and storing metrics on edge devices. In particular, as detailed below, the real-time reporting system facilitates efficiently collecting and processing metrics, automatically configuring multi-level aggregation of metrics, customizing metric validation, customizing retention handling, and virtually grouping edge devices. Additionally, the real-time reporting system works on devices ranging from memory-constraint edge devices to large cloud computing systems.

To elaborate, in one or more implementations, the real-time reporting system further processes the published event data to generate aggregated data that is persisted to a persistence storage. In this manner, the real-time reporting system efficiently and accurately provides event data reports to client devices with processed metric data in real time, or in near-real time when utilizing additional fallback safeguards. Indeed, the real-time reporting system provides a highly available, fault-tolerant, distributed, scalable, and efficient mechanism for collecting and managing various metrics from services in edge or cloud environments.

To illustrate, in one or more implementations, the real-time reporting system detects, in real time, event data generated by a data source, where the event data is to be written to an event record (e.g., a service log, an audit log, or a database journal). In response, the real-time reporting system stores, within non-persistent memory and in real time, a copy of the event data in an event group that includes an event map. Additionally, the real-time reporting system also publishes the event map with a unique event group identifier to a distributed queue, in real time, as published event data. Further, the real-time reporting system generates processed event data by reading the published event data from the distributed queue into a consumer event map, processing the published event data using a data processing service (e.g., consumers and aggregators) based on the unique event group identifier, and persisting the processed event data from the consumer event map to a persistence store. The real-time reporting system also accesses the processed event data from the persistence store and provides it as reported data to a computing device (e.g., for display).

As described herein, the real-time reporting system provides several technical benefits in terms of computing efficiency, accuracy, and flexibility compared to existing computing systems. Indeed, the real-time reporting system provides several practical applications that deliver benefits and/or solve problems associated with real-time edge device metric monitoring and reporting.

To illustrate the technical benefits of the real-time reporting system, consider how existing computer systems suffer from significant inefficiencies, inaccuracies, and inflexibilities of existing systems regarding monitoring and reporting metrics with edge devices in a local network. To elaborate, existing computer systems that use edge devices often inefficiently monitor, collect, and report important information and metrics (e.g., event data, system data, and other data) reported by a local computing device within a local network. For example, existing computer systems largely report metrics asynchronously, not in real time. Rather, these existing computer systems are agent-based and rely on system processes to slowly collect metrics, then publish the metrics by sending batches to a cloud computing system in delayed intervals.

Additionally, in many instances, the cloud system remotely aggregates the received data and, upon receiving a query from a client device in the same local network as the edge device, the cloud system provides the processed event data back to the local network. However, sending data from a local network to a cloud system and returning processed event data to the local network can require a large number of hops each way, which introduces latency and subjects the data to several network errors.

Further, many existing computer systems do not aggregate data in a useful format. Rather, these existing computer systems often provide unorganized data that requires computing resources and time before useful information can be extracted. Similarly, existing computer systems often suffer from employing an excessive number of event data reports and requests, which wastes computing resources.

Moreover, existing computer systems are often inaccurate. For example, in many implementations, existing computer systems inefficiently report and process duplicate data, which not only wastes bandwidth and computing resources (e.g., processing power and memory), but also can cause inaccuracies when aggregating data. For example, duplicate data entries can skew the total memory usage result of a local device.

To illustrate another example of inaccuracy, local networks often become disconnected from a corresponding cloud computing system and/or the public internet. When a local network disconnects from a cloud computing system, existing computer systems are cut off from monitoring and reporting metrics. As a result, administrators associated with the local network often cannot accurately discover what activity is occurring in the local network or the status of local computing devices.

Further, existing computer systems are inflexible. To illustrate, many existing computer systems are fixed to a very specific operating system and expect data from a set number of devices. Additionally, several existing computer systems require large amounts of computing resources (e.g., processing power, memory, and storage). Both of these restrictions often limit the number of devices in a local network that can be monitored.

As mentioned above, in various implementations, the real-time reporting system improves efficiency by providing real-time reporting of metrics by an edge device for a local network (e.g., an on-premises network operated by an entity). For example, in various implementations, unlike agent-based systems, the real-time reporting system captures and stores real-time event data (e.g., service event data intended to be written to a system-based service log or a database journal) in an in-memory (e.g., non-persistent or volatile memory) queue for quick and efficient publishing. In this manner, the real-time reporting system enables the published data to be quickly processed and stored in a persistence store for quick access by user client devices (e.g., client devices associated with users). Unlike existing computer systems, the real-time reporting system does not suffer from large latency delays when sending (e.g., dumping) event data from an edge device to a cloud computing system, waiting for the cloud computing system to process the data, and/or the data is sent back to the edge device.

As another example, the real-time reporting system efficiently stores event data in groups such as event maps and event map groups. As a result, the real-time reporting system reduces the number of data transfers and requests, which improves publishing and processing as well as reduces bandwidth utilization. In various implementations, the real-time reporting system utilizes event maps and event map groups to improve communication efficiency while not introducing delays into the system. As a result, fewer storage requests and fewer reports to the system of an edge device are made. Indeed, the real-time reporting system utilizes a hierarchical aggregation model that aggregates data on various levels, which reduces the number of calls and requests between a system and components. For example, in addition to processing that may occur at each level, in the hierarchical aggregation model, received metrics are aggregated into event maps, which are aggregated into published event groups, which are aggregated into processed data. Further, having aggregated data enables the real-time reporting system to operate when disconnected from cloud services.

Additionally, by efficiently publishing, processing, and storing event data metrics, the real-time reporting system reduces duplicate publishing as well as duplicate processing. For example, the real-time reporting system publishes data once, even for data reported multiple times. In various implementations, the real-time reporting system utilizes unique keys in a key value store to aid in processing and filtering out previously processed pieces of data. Similarly, in many implementations, the real-time reporting system processes data only once to reduce wasted processing of redundant data.

As mentioned above, the real-time reporting system improves reporting and processing accuracy of event data over existing computer systems. For example, in many implementations, the real-time reporting system provides idempotent processing that eliminates inaccurate aggregation and processing of event data. Further, in various implementations, the real-time reporting system utilizes event maps aggregated in a time series format and/or unique keys to aid in avoiding duplicate processing. For instance, the real-time reporting system utilizes these tools to filter out previously processed data, which could lead to inaccurate operations and results.

As another example, the real-time reporting system provides improved reporting and processing accuracy and resiliency of event data over existing computer systems by performing improved fault tolerance actions. For example, the real-time reporting system utilizes a fallback mechanism that utilizes strategically-placed fallback markers that track the status of event data writing, publishing, and processing. Further, in various implementations, the real-time reporting system utilizes the fallback markers with different markers as well as stores the fallback markers in different memory types and locations to ensure event data is recoverable in the event of an edge device failure.

As mentioned above, the real-time reporting system improves flexibility over existing computer systems. For example, in various implementations, the real-time reporting system operates on most edge devices including memory-constrained edge devices. The real-time reporting system is also device agnostic, not being constrained to a specific type of device or operating system. Further, the real-time reporting system is scalable to any number of devices and works with any size of network (e.g., from memory-constrained devices to very-highly scalable cloud services). Additionally, the real-time reporting system is able to utilize persistence stores (e.g., a key value store) on edge devices, cloud computing systems, or both.

As an additional example, the real-time reporting system works when disconnected from a corresponding cloud computing system and/or the public internet. Indeed, in various implementations, the real-time reporting system operates on an edge device that is intentionally or unintentionally disconnected from a corresponding cloud computer system. In addition to being able to operate independently of a cloud computing system, the real-time reporting system also flexibly provides customizable event data aggregations and processing.

As illustrated in the foregoing discussion, the present disclosure utilizes a variety of terms to describe the features and advantages of one or more implementations described herein. For instance, the term "edge computing device" (or "edge device") refers to a computing device that serves as an intermediary between local computing devices in a network (e.g., a local network) and computing systems outside of the local network (e.g., a cloud computing system). In various implementations, an edge device follows an edge computing model that physically shifts computing resources from central data centers or public clouds closer to local devices. In one or more implementations, an edge device includes a server device. For example, in implementations, an edge device is a Stack Edge device that serves as a local cloud storage gateway that enables data transfers to cloud devices. In alternative implementations, an edge device is another type of computing device. In various implementations, an edge device is implemented in hardware. In example implementations, an edge device includes software operations.

As used herein, the term "local network" refers to a network that operates apart from the public Internet and that includes an edge device. For example, a local network includes local computing devices (or "local devices") and one or more edge devices. In some implementations, local devices include Internet-of-Things (IoT) devices, appliances, and/or other computing devices. Additionally, in various implementations, a local network includes computing devices that provide network functions (either using hardware or software). In various implementations, a local network connects an edge device to one or more cloud computing systems either directly or via the public Internet. For example, while a local network may operate apart from the public Internet, in various instances, the local network utilizes the public Internet to provide data to computing devices located outside of the local network (e.g., the operation of a local network may be enhanced based on outside communications). Additionally, in some cases, a local network is referred to as an edge network.

As used herein, the term "event data" refers to data that corresponds to a computing event (e.g., a computing action) that is provided by or for a service or computing device on a local network. For instance, a computing device or service within a local network generates or emits event data in the form of event data metrics. For example, event data emitted by services includes event data metrics such as central processing unit (CPU), storage, power, network, and bandwidth statistics and usage. In some implementations, event data includes other event data metrics/data from local devices that are recorded in a service log or a database journal. In various implementations, event data provides the status of devices within a network and/or the status of the network as a whole. As described herein, event data is written, published, read, aggregated, and/or otherwise processed.

As a note, while portions of this disclosure describe collecting, publishing, processing, and reporting metrics for ease of explanation, these descriptions equally apply to the broader category of collecting, publishing, and processing other event data. For example, the event data collector described herein could be an event data collector that performs similar functions with respect to various types of event data or event data as a whole.

As used herein, the term "event map" refers to a data structure for storing event data including metrics. In various implementations, an event map stores data in a time series format. In some implementations, an event map holds event data (e.g., metrics) to be monitored. An example of an event map includes a concurrent hash map. Event maps include both unsealed event maps that are writeable and sealed event maps that are not writable. In some implementations, multiple event maps are grouped together to form an event map group (or simply "event group"). In one or more implementations, event maps include unpublished and/or unprocessed event data. In alternative implementations, event maps include aggregated and processed event data, such as a consumer event map (e.g., a "consumer event map" includes aggregated processed data generated by consumer components). Additionally, in certain implementations, an event map is associated with an identifier, such as an event map identifier or an event group identifier. These identifiers are unique, in many implementations.

As used herein, the term "persistence store" refers to a storage device that retains data after power to that device is shut off. In various implementations, a persistence store includes non-volatile storage. Additionally, in various implementations, a persistence store refers to storage volumes in containerization that are associated with stateful applications, such as databases. In these implementations, a persistence store retains data beyond the life of individual containers.

Similarly, the term "in-memory" refers to a storage element (e.g., a non-physical component like a queue) or device that retains data while power to that device is supplied. When power is cut off or disrupted the in-memory element does not retain the data. In various implementations, an in-memory storage element or device includes volatile memory or non-persistent memory. In various implementations, the real-time reporting system utilizes an in-memory queue for temporarily storing event data to be published.

As used herein, the term "real time" refers to the live processing of events and data as they are generated and/or provided. In various implementations, real time includes near-real time, which accounts for minimal processing constraints. Additionally, real time is more current than near-real time. For example, real-time does not include long processing delays from a processor having idle cycles or waiting for data to accumulate before processing.

Figure 1B:
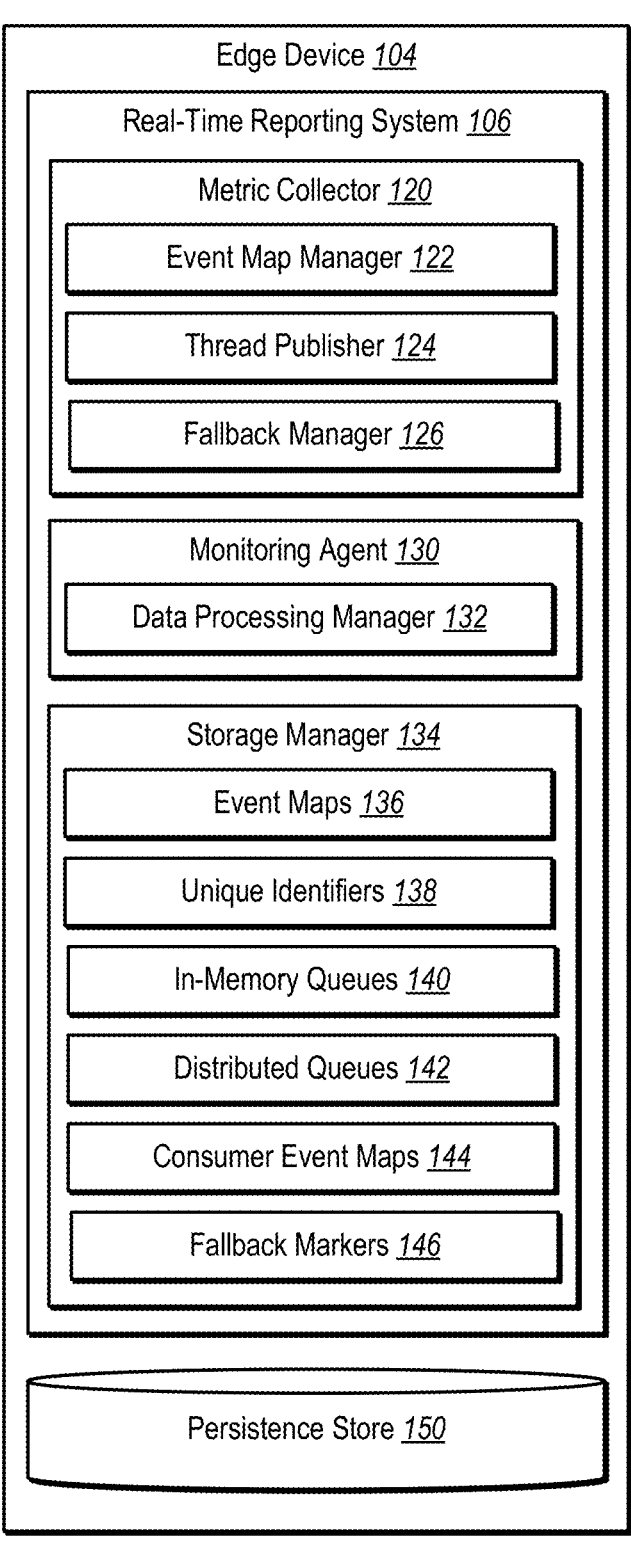

Additional detail will now be provided regarding the components and elements of the real-time reporting system. For example, FIGS. 1A-1B illustrate a schematic diagram of an example environment 100 (e.g., a digital medium system environment) for implementing a real-time reporting system 106. In particular, FIG. 1A includes the environment 100 and FIG. 1B provides additional detail regarding components and elements of the real-time reporting system 106.

As shown in FIG. 1A, the environment 100 includes an on-premises network 102 that includes various computing devices. For example, the on-premises network 102 is a type of local network that includes an edge device 104, local devices 108, and an administrator device 110. In addition, the environment 100 includes a cloud computing system 114 connected to the on-premises network 102 via a network 118. Additional detail regarding these and other computing devices is provided below in connection with FIG. 10. In addition, FIG. 10 also provides additional detail regarding networks, such as the network 118 shown.

As also shown, the edge device 104 includes a real-time reporting system 106. In various implementations, the real-time reporting system 106 identifies, collects, receives, monitors, provides, publishes, modifies, processes, aggregates, and stores metrics (e.g., event data metrics) from the local devices 108 in the on-premises network 102. Further, in some implementations, the real-time reporting system 106 also provides real-time or near-real-time reporting of metrics from the local devices 108 to a user client device, such as the administrator device 110 (e.g., a client device associated with an administrator user). Additional detail regarding the real-time reporting system 106 is provided below in the subsequent figures. For example, details and components of the real-time reporting system 106 are further provided below in connection with FIG. 1B.

As mentioned, the on-premises network 102 includes local devices 108. In various implementations, the local devices 108 include computing devices that implement services and operations (e.g., IoT devices, network routing, packet processing, device reporting) within the on-premises network 102. For example, a local device includes an IoT device (e.g., a security device, an environment monitoring device, or an automation device) that provides event data to the edge device 104. For instance, the edge device 104 stores service logs and/or database journals that include data received from the local devices 108. In some instances, the edge device 104 sends data (e.g., processed and aggregated data) to the cloud computing system 114.

As shown, the environment 100 includes the cloud computing system 114. As also shown, the cloud computing system 114 includes cloud services 116. For example, the cloud services 116 provide supplemental processing to the edge device 104 in various instances. The cloud services 116 of the cloud computing system 114 also provide support to other edge devices and/or computing devices located on additional local networks. In some implementations, the cloud computing system 114 provides cloud storage to the edge device 104 and/or devices on the on-premises network 102.

As shown, the on-premises network 102 includes the administrator device 110. In one or more implementations, the administrator device 110 is a client device that is associated with a user (e.g., an administrator). As also shown, the administrator device 110 includes a client application 112. In various implementations, the client application 112 enables an administrator or other user to interact with the real-time reporting system 106, such as providing metric queries, modifying or customizing aggregation operations, and/or viewing real-time event data reports provided by the real-time reporting system 106.

As mentioned above, FIG. 1B provides additional detail regarding the capabilities and components of the real-time reporting system 106. To illustrate, FIG. 1B shows the edge device 104 having the real-time reporting system 106 and a persistence store 150. In some implementations, the real-time reporting system 106 is included on multiple edge devices and/or other computing devices within the on-premises network 102. In one or more implementations, the real-time reporting system 106 resides, in whole or in part, on computing devices located outside of the on-premises network 102. Additionally, the edge device 104 includes a persistence store 150, which stores data such as event map data having processed event data (e.g., metrics). For example, the persistence store 150 includes consumer event maps 144.

As shown, the real-time reporting system 106 includes various components and elements, which are implemented in hardware and/or software. For example, the real-time reporting system 106 includes an event data collector 120, a monitoring agent 130, and a storage manager 134. As shown, the event data collector 120 includes an event map manager 122, a thread publisher 124, and a fallback manager 126. As also shown, the monitoring agent 130 includes a data processing manager 132. Also, as shown, the storage manager 134 includes event maps 136, unique identifiers 138, in-memory queues 140, distributed queues 142, and fallback markers 146.

As shown, the real-time reporting system 106 includes the event data collector 120. In one or more implementations, the event data collector 120 receives, collects, identifies, modifies, provides, publishes, or otherwise manages metrics received from local devices (e.g., the local devices 108). For example, the event data collector 120 utilizes the event map manager 122 to group monitored data into event maps 136 (e.g., unsealed event maps). Further, in some instances, the event data collector 120 provides one or more of the event maps 136 (e.g., sealed event maps) to one of the in-memory queues 140 (e.g., temporary memory on the edge device 104).

Additionally, in one or more implementations, the event data collector 120 utilizes the thread publisher 124 to publish the event maps 136 to the monitoring agent 130. For instance, the thread publisher 124 publishes an event map (e.g., as published event data) to one of the distributed queues 142 associated with the monitoring agent 130. Further, in some implementations, the event data collector 120 (e.g., via the thread publisher 124) assigns one of the unique identifiers 138 to an event map in connection with publishing it. As used herein, "published event data" refers to data from the event data collector 120 that is provided to the monitoring agent 130. In many implementations, published event data includes event maps read from an in-memory queue. Additional details regarding published event data are provided below in connection with FIG. 4.

Further, in various implementations, the event data collector 120 utilizes the fallback manager 126 to recover lost metrics in the event of the edge device 104 failing. For example, the fallback manager 126 strategically sets fallback markers 146, such as a current write marker to indicate a current write position of monitored event data and/or a parser marker (e.g., a publisher marker) to indicate a current position of event maps published to the monitoring agent 130. In various implementations, the fallback manager 126 operates on or in connection with the monitoring agent 130. For example, the fallback manager 126 places a process marker to indicate the current position of event maps 136 and/or event data is processed by the monitoring agent 130. Additional details regarding fallback markers 146 are provided below in connection with FIG. 7.

As shown, the edge device 104 includes the monitoring agent 130. In various implementations, the monitoring agent 130 facilitates receiving, modifying, identifying, aggregating, processing, and/or storing metrics published as event maps 136. For example, the monitoring agent 130 receives published event maps (e.g., as published event data) in one of the distributed queues 142.

Further, the monitoring agent 130 utilizes the fallback manager 126 to process and/or aggregate the event maps 136 as they are removed from the distributed queues 142. In various implementations, the fallback manager 126 generates consumer event maps 144 from the processed event data and stores the consumer event maps 144 at the persistence store 150. Additional detail regarding functions of the event data collector 120, the monitoring agent 130, and the persistence store 150 are provided below in subsequent figures.

While the event data collector 120 and the monitoring agent 130 are shown on the same component device, in some implementations, they are located on different computing devices. For example, the event data collector 120 is located on the edge device 104 and the monitoring agent 130 is located on an administrator device within a local network (or located outside the local network).

Figure 2:
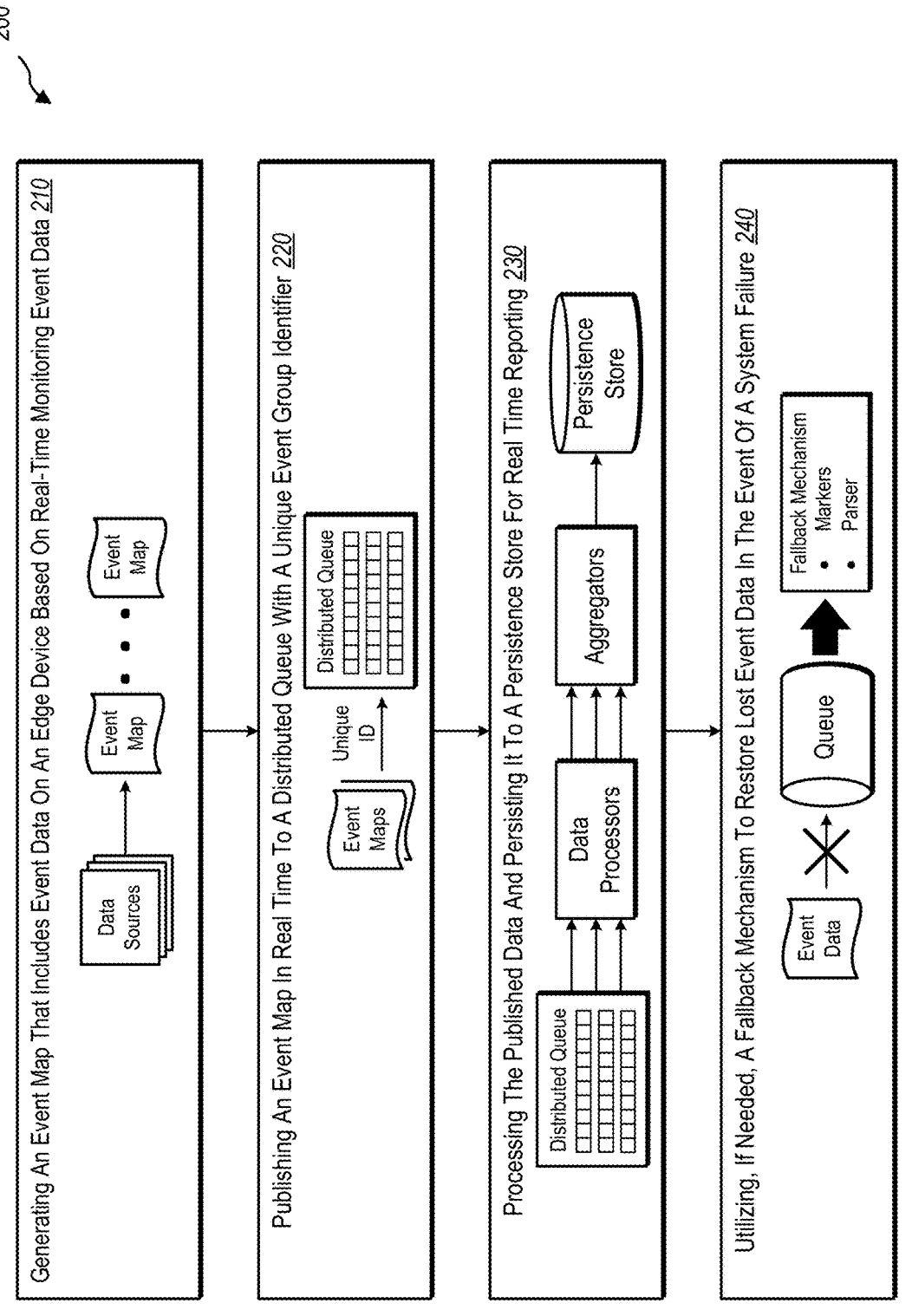
FIG. 2 illustrates an example overview for implementing the real-time event data reporting system along with a fallback mechanism in accordance with one or more implementations.

Additional detail in connection with an example implementation of the real-time reporting system 106 is discussed in connection with FIG. 2. For example, FIG. 2 illustrates an example overview for implementing the real-time event data reporting system along with a fallback mechanism in accordance with one or more implementations. As shown, FIG. 2 illustrates a series of acts 200 performed by the real-time reporting system 106.

As also shown in FIG. 2, the series of acts 200 includes an act 210 of generating an event map that includes event data on an edge device based on real-time monitoring of event data. For example, the real-time reporting system 106 detects metrics (e.g., event data) generated by services on local devices and provided to an edge device to be written to a service log or database journal on the edge device. Additionally, in various implementations, the real-time reporting system 106 generates an event map from the metrics and places the event map in an in-memory queue. Additional detail regarding generating event maps and in-memory queues is provided below in connection with FIGS. 3 and 4.

In addition, FIG. 2 shows that the series of acts 200 includes an act 220 of publishing an event map in real time to a distributed queue with a unique event group identifier. For example, the real-time reporting system 106 publishes one or more event maps from the in-memory queue to a distributed queue. In some implementations, the real-time reporting system 106 groups multiple event maps into an event group and publishes the event group to the distributed queue. In addition, the real-time reporting system 106 generates a unique event group identifier for the event group. Additional detail regarding publishing event maps and unique event identifiers is provided below in connection with FIGS. 3 and 4.

As also shown, the series of acts 200 includes an act 230 of processing the published data and persisting it to a persistence store for real-time reporting. For instance, in various implementations, the real-time reporting system 106 receives event data from the distributed queue and processes the event data with one or more operations. For example, the real-time reporting system 106 provides the published data to one or more data processors (i.e., data processing services). In additional implementations, the real-time reporting system 106 provides the processed event data to one or more data aggregators to perform additional operations.

Also, in various implementations, the real-time reporting system 106 generates a consumer event map that includes processed and or aggregated event data and provides the consumer event map to a persistence store. In this manner, the real-time reporting system 106 provides processed event data that is ready to be presented to a user client device, such as an administrator device, in a real-time event data report. Additional detail regarding processing published data and persisting it is provided below in connection with FIGS. 3 and 4. An example of providing a real-time event data report is provided below in connection with FIG. 8.

Further, the series of acts 200 includes an act 240 of utilizing, if needed, a fallback mechanism to restore lost event data in the event of a system failure. For example, in various implementations, the real-time reporting system 106 creates and places markers to track the current progress of event data being written to event maps, published to the distributed queue, and/or processed. Then, in the event that the edge device fails, a service restarts, or another failure occurs, the real-time reporting system 106 utilizes one or more markers to determine what event data has been published and what data was lost. In this manner, the real-time reporting system 106 recovers any lost event data that was not published as well as minimizes publishing duplicate event data. Additional details regarding fallback mechanisms and event data recovery are provided below in connection with FIG. 7.

Figure 3:
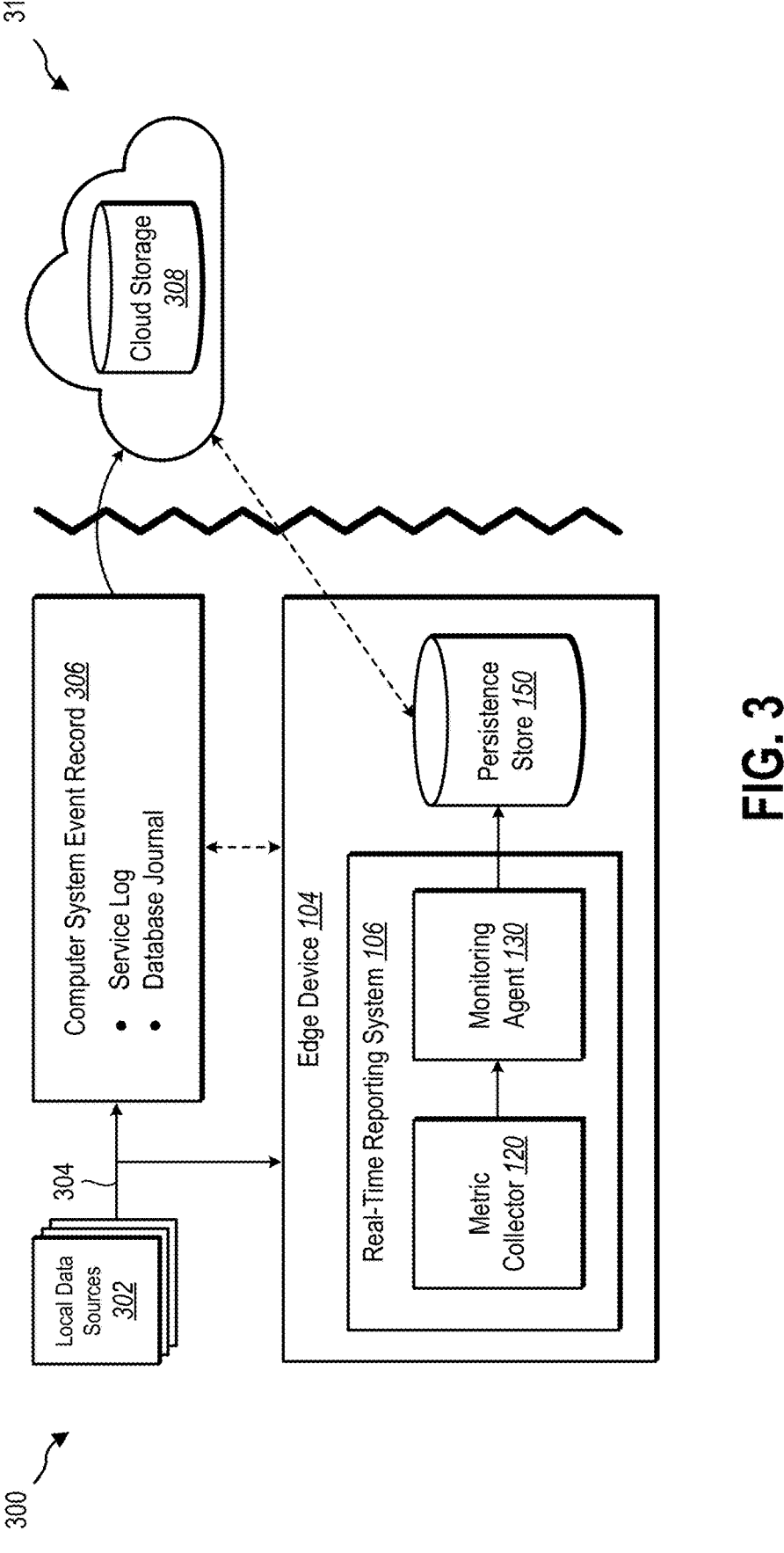
FIG. 3 illustrates a diagram of example actions and operations performed by a real-time event data reporting system to improve event data reporting in accordance with one or more implementations.

As noted above, FIG. 3 provides more detail regarding operations of the real-time reporting system 106. In particular, FIG. 3 illustrates a block diagram of actions and operations performed by a real-time event data reporting system to improve event data reporting in accordance with one or more implementations. As illustrated, FIG. 3 includes a local network 300 and a remote network 310 located apart from the local network and connected via one or more intermediary networks (e.g., the public Internet).

As shown, FIG. 3 includes the edge device 104 introduced above, local data sources 302, a computer system event record 306, and cloud storage 308. As shown the edge device 104 includes the real-time reporting system 106 having the event data collector 120, the monitoring agent 130, and the persistence store 150, introduced above. In various implementations, the local data sources 302 includes services operating on local devices. In additional implementations, the local data sources 302 include additional sources that provide event data and/or metrics.

As shown, the local data sources 302 emit metrics 304 (e.g., multiple event data metrics) that are captured by a computer system. For instance, FIG. 3 shows the metrics 304 being received at the computer system event record 306. In various implementations, the computer system event record 306 is located within the edge device 104 (as indicated by the small, dashed line). In some implementations, the computer system event record 306 is located on another device within the local network 300.

As also shown, the computer system event record 306 collects the metrics 304 and provides them to the cloud storage 308. As shown, the cloud storage 308 is located on the remote network 310. In some implementations, the cloud storage 308 is part of a cloud computing system associated with the edge device 104. For example, the cloud computing system is a stack edge service cloud system that provides support to the edge device 104. In many instances, however, providing the metrics 304 to the cloud storage 308 requires a large number of hops, which increases the potential for latency issues.

In some implementations, the computer system event record 306 includes a recording system for recording the metrics 304. As a first example, the computer system event record 306 is a service log system that records metrics (e.g., metric event data) to service logs. For example, the service logs are written to a file system by a system log library as the file system receives log streams (e.g., the metrics 304). In some instances, the file system includes a separate service log (or set of service logs) for each service or service type that provides event data. In various implementations, service log files are identified by unique names and/or are based on types or levels of services being provided. Additionally, in various instances, a first service log rotates to a new second service log when the first service log is full.

As another example, the computer system event record 306 is a database journal. For example, a database provides a database journal having multiple pages for recording changes that are to be applied to the database. For example, a database journal serves as a "look-ahead" log where database modifications are first written to the database journal before indexing to the database. Additionally, in various implementations, when one database journal page is full, the system can rotate to record newly received in another database journal page.

As mentioned above, in certain implementations, the real-time reporting system 106 on the edge device 104 also receives the metrics 304. For example, the edge device 104 receives or creates a copy of the metrics 304 as they are provided to the computer system event record 306. More specifically, in many implementations, the real-time reporting system 106 embeds the event data collector 120 into a service log or a database journal to facilitate real time monitoring (and copying) of metrics 304 provided by the local data sources 302. Indeed, in various implementations, the event data collector 120 is a general structure that the real-time reporting system 106 embeds into any metric recording service.

To illustrate, in the first example, the real-time reporting system 106 causes the event data collector 120 to capture and convert the log string written to the file system (e.g., the computer system event record 306) to an event object to be added to an event map within the event data collector 120. In various implementations, the event data collector 120 monitors and collects a copy of the metrics 304 before, after, or at the same time as they are written to a service log (e.g., the computer system event record 306).

In a second example, the real-time reporting system 106 causes the event data collector 120 to collect the metrics 304 in the event map after it is written to the database journal, but before it is written to the database index. In alternative implementations, the real-time reporting system 106 collects a copy of the metrics 304 before or overlapping with writing it to the database journal.

Upon collecting the metrics 304, the event data collector 120 processes and/or publishes one or more event maps and provides them to the monitoring agent 130, as noted above. For example, the event data collector 120 writes the data of the event maps to a distributed queue within the monitoring agent 130. Additional detail regarding elements, components, and operations of the event data collector 120 is provided below in connection with FIG. 4.

As noted above, the edge device 104 and the real-time reporting system 106 are included in a local network that is apart from the remote network 310. In various implementations, the real-time reporting system 106 operates when disconnected from the cloud storage 308, an associated cloud computing system, and/or public networks (e.g., the Internet). Indeed, because the real-time reporting system 106 is locally embedded or injected within system services of the edge device 104 and because the event data collector 120, the monitoring agent 130, and the persistence store 150 are located within the local network 300, the real-time reporting system 106 is able to operate to provide real-time metric monitoring and reporting while the edge device 104 is in disconnected mode (e.g., disconnected from the cloud storage 308, an associated cloud computing system, and/or public networks).

As mentioned above, in various instances, the real-time reporting system 106 causes the monitoring agent 130 to further process the published metrics. In addition, in some instances, the monitoring agent 130 writes the processed metrics to a consumer event map and persists the consumer event map to the persistence store 150 (e.g., generating event maps from a first level of a hierarchical aggregation structure). Additional details regarding elements, components, and operations of the monitoring agent 130 and the persistence store 150 are provided below in connection with FIG. 5.

Figure 4:
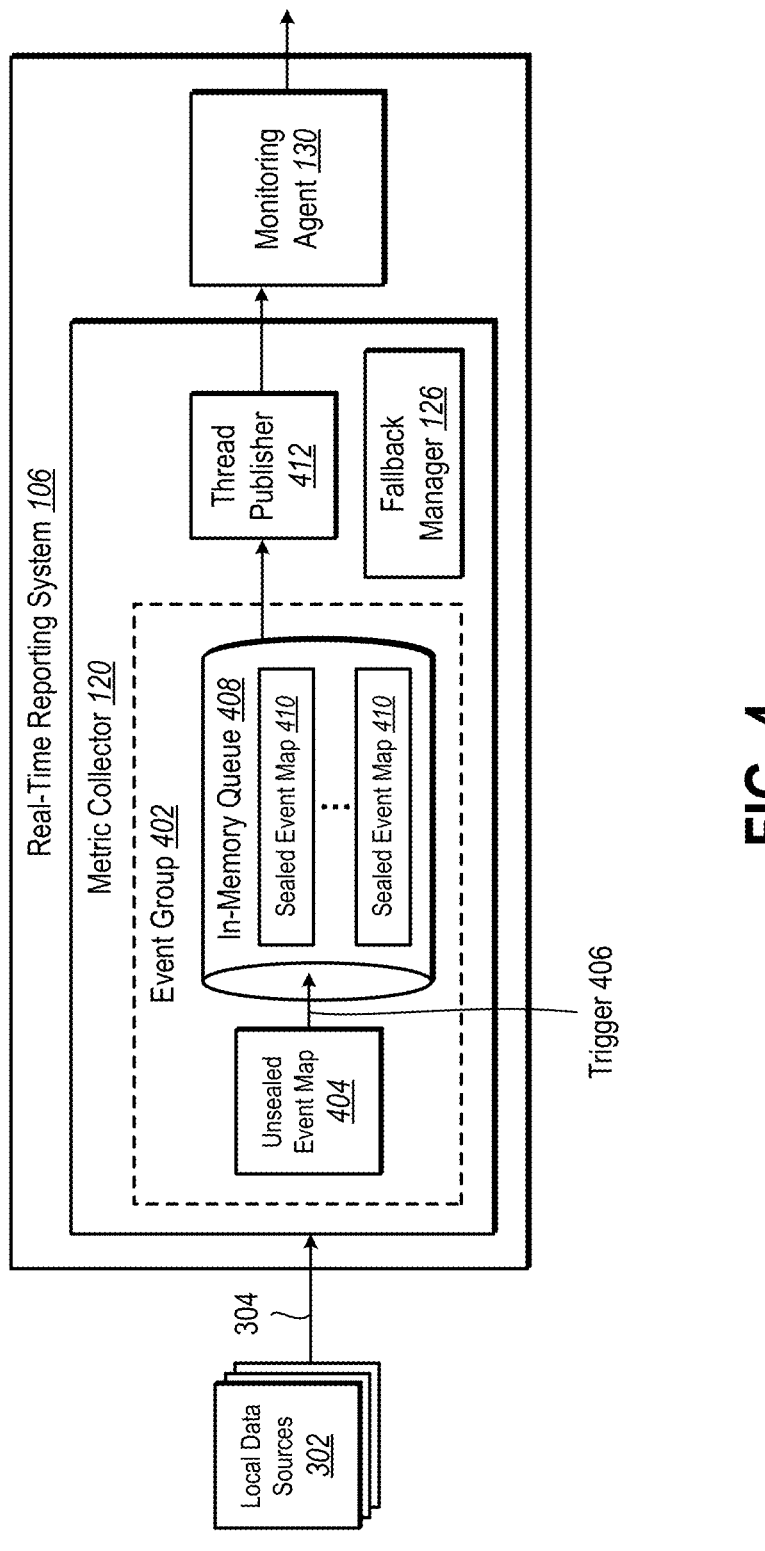
FIG. 4 illustrates a diagram of an example method of publishing event maps from received event data utilizing an event data collector within the real-time event data reporting system in accordance with one or more implementations.

Turning to the next figure, FIG. 4 illustrates a block diagram of publishing event maps from received event data utilizing an event data collector within the real-time event data reporting system in accordance with one or more implementations. As shown, FIG. 4 includes the local data sources 302, the fallback manager 126, as well as the real-time reporting system 106 having the event data collector 120, and the monitoring agent 130, each of which is introduced above. Additionally, the event data collector 120 includes an event group 402, an unsealed event map 404, an in-memory queue 408 having sealed event maps 410, and a thread publisher 412.

As described above, in various instances, the real-time reporting system 106 utilizes or causes the event data collector 120 to collect the metrics 304 from the local data sources 302 in real time as the data is provided or received. In various implementations, the event data collector 120 writes the metrics 304 to the event group 402. In particular, in some instances, the event data collector 120 writes the metrics 304 to an unsealed event map 404 within the event group 402. In one or more implementations, the event data collector 120 continues to write to the unsealed event map 404 until a trigger 406 (e.g., a fullness event map threshold)

occurs, at which point, the event data collector 120 rotates or converts the unsealed event map 404 into one of the sealed event maps 410 as well as stores it in the in-memory queue 408. In various instances, once an event map is sealed, event data cannot be written to it (e.g., the sealed event map is a non-writable map).

As mentioned above, in some instances, the event data collector 120 converts the unsealed event map 404 into one of the sealed event maps 410 based on the trigger 406 (e.g., a fullness event map threshold). In various implementations, the trigger 406 or fullness event map threshold is based on a file size being reached, such as the unsealed event map 404 becoming full, approaching a specified size, or reaching a configurable size value (e.g., a file size-based trigger event). In some implementations, the trigger 406 or fullness threshold is time-based, such as sealing an unsealed event map upon reaching a predetermined or configurable time duration. In one or more implementations, the trigger 406 is based on further factors, such as the number of writes or the amount of time since the last write.

In various implementations, an event group 402 includes both an unsealed event map and sealed event maps. In some instances, an event group 402 includes a single unsealed event map, that is being actively written to and any number of sealed event maps (including zero). For example, a new event group includes an unsealed event map 404 without yet having sealed event maps 410. Also, as noted above, in some instances, an event map is a data structure like a concurrent hash map that holds the metric data needing to be monitored.

In various implementations, the event data collector 120 converts the unsealed event map 404 to one of the sealed event maps 410 by enqueuing the newly sealed event map to the in-memory queue 408. Additionally, when an unsealed event map is sealed, in some instances, the event data collector 120 creates a new empty event map within the event group 402. In various instances, the in-memory queue 408 is a global single in-memory queue.

In various implementations, the real-time reporting system 106 assigns an identifier to an event group. For example, the event data collector 120 assigns a unique event group identifier to the event group 402. For instance, the event data collector 120 generates a unique event group identifier based on a data source, service, or node providing the metrics 304 and/or based on other elements.

To elaborate, in various implementations, the event data collector 120 generates an identifier for an event group that includes a prefix and a suffix. In some instances, the prefix is constant while the suffix is variable (or vice versa). In one example, the prefix indicates the local data source, service name, and/or node identifier associated with the metrics 304 being provided. In the case of a log file, in various instances, the prefix includes a node identifier, a service name, and/or a log filename. In the case of a database journal, in some instances, the prefix includes a partition number, event group, journal number, epoch, and/or journal offset. Additionally, the suffix indicates a timestamp or epoch associated with writing the metrics 304 to the unsealed event map 404, such as an epoch and/or timestamp. As a result, in some instances, the real-time reporting system 106 utilizes the unique group event identifier (e.g., a semantic identifier) to quickly retrieve a desired metric or event group including identifying a target event group from a set of similar event groups.

To illustrate with an example, suppose Service 1 is running on a local device and generates event data such as the current memory capacities of the local device. In response to providing the current memory capacities, the event data collector 120 captures the metrics and adds them to one or more event maps in an event group. In this example, the event data collector 120 generates a unique group identifier having a prefix of Si based on the name of Service 1. Additionally, the event data collector generates the suffix for the unique group identifier of Ti based on the timestamp Time 1, which represents when the event data was generated by Service 1 and/or written to one or more event maps.

In various implementations, the event data collector 120 generates monotonically increasing unique identifiers. In some instances, this occurs based on a timestamp or epoch data being monotonically increasing. For example, data generated from Service 1 over a time interval is written across different event maps and/or event groups, and the suffix portion of the different generated unique identifiers continues to increase to align with when corresponding data was received.

As shown in FIG. 4, the event data collector 120 includes the thread publisher 412. In various implementations, the thread publisher 412 publishes event groups to the monitoring agent 130. For example, in one or more implementations, the event data collector 120 utilizes the thread publisher 412 to dequeue an event map from the in-memory queue 408, publish it to the monitoring agent 130, and iterate to the next event map in the event group 402. Indeed, in various instances, the thread publisher 412 publishes or persists event data from event maps to a distributed queue on the monitoring agent 130. In this manner, despite highly loaded services being able to generate vast numbers of events, the real-time reporting system 106 utilizes event maps to provide a vehicle or mechanism to aggregate event data and metrics in the in-memory queue to reduce the amount of data sent to the distributed queue (e.g., publishes event groups form another level of the hierarchical aggregation structure).

In various implementations, the thread publisher 412 operates at given time intervals. For example, the event data collector 120 causes the thread publisher 412 to "wake" at given intervals to read the in-memory queue 408. If the in-memory queue 408 is empty, the thread publisher 412 goes back to an idle state to conserve computer resources. Otherwise, the thread publisher 412 quickly and efficiently publishes the queued event data. In various implementations, the interval is short enough to not detrimentally affect the real-time processing of the event data collector 120. Indeed, by utilizing the in-memory queue 408, the real-time reporting system 106 is able to operate in real time.

In some implementations, when publishing the event data, the thread publisher 412 also publishes a unique identifier with the event map. For example, the thread publisher 412 provides an event map and its unique event group identifier to the monitoring agent 130. As another example, the thread publisher 412 provides event data (e.g., a subset of an event map) and a corresponding unique identifier to the monitoring agent 130.

In various implementations, the thread publisher 412 utilizes a dump thread to publish an event map data to the monitoring agent 130. For example, the thread publisher 412 provides a snapshot of the state of one or more event maps in the in-memory queue 408. As another example, the thread publisher 412 utilizes the dump thread to "dump" event data from an event map to a common thread to be more efficiently published.

As also shown, the event data collector 120 includes the fallback manager 126. While additional detail regarding utilizing fallback mechanisms is provided below in connection with FIG. 7, a brief overview is provided here. In various implementations, the fallback manager 126 utilizes a parser to re-read event data that was potentially lost in the event of a write failure, such as a power loss, a service restart, etc. In these implementations, to facilitate efficiency and limit redundant processing, the parser utilizes markers that indicate a window of potentially lost event data. For example, the markers include a current write marker and a parser marker (e.g., a published marker) that indicates maximum and minimum time limits for the parser. Then, in various implementations, the event data collector 120 utilizes the fallback manager 126 to ensure that all event data is properly analyzed and stored.

Figure 5:
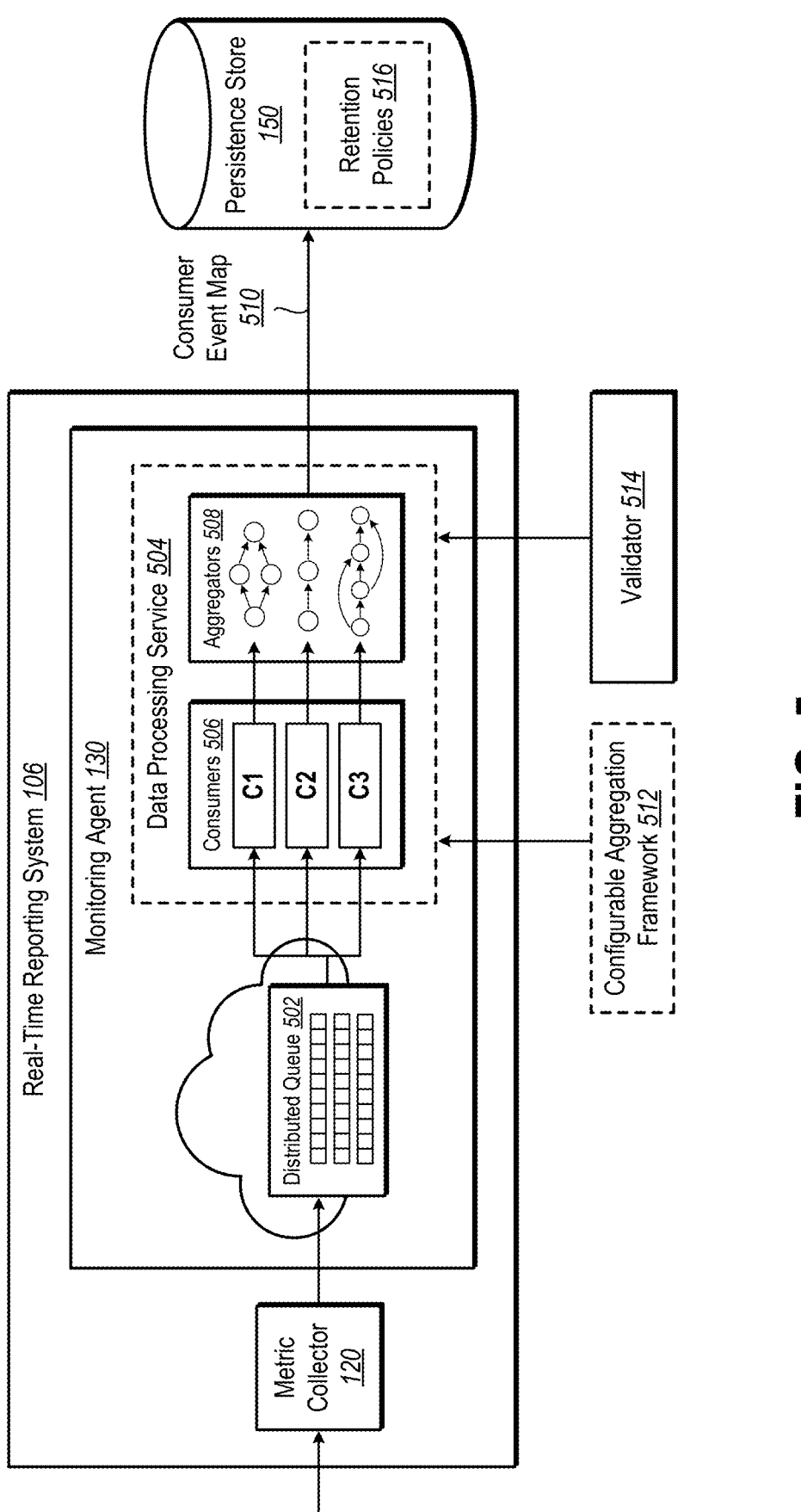
FIG. 5 illustrates a diagram of an example method of persisting organized data to a persistence store utilizing a monitoring agent within the real-time event data reporting system in accordance with one or more implementations.

Turning now to FIG. 5, additional detail is provided regarding the monitoring agent 130. In particular, FIG. 5 illustrates a block diagram of persisting organized data to a persistence store 150 utilizing a monitoring agent 130 within the real-time reporting system 106 in accordance with one or more implementations. As shown FIG. 5 includes the real-time reporting system 106 having the event data collector 120, the monitoring agent 130, and the persistence store 150, each of which is introduced above. Additionally, the monitoring agent 130 includes a distributed queue 502 and a data processing service 504, which includes consumers 506 and aggregators 508. In addition, FIG. 5 includes a configurable aggregation framework 512 and a validator 514 associated with the monitoring agent 130.

As described above, the event data collector 120 publishes event maps to the monitoring agent 130. In response, the monitoring agent 130 queues the published data on the distributed queue 502. In one or more implementations, the distributed queue 502 includes one or more physical queues distributed across multiple servers or computing devices, but which are grouped under a common name to appear as a single logical queue to the event data collector 120. In some instances, a distributed queue is a message broker or other type of data broker that includes queues for sending data between applications and services.

In various implementations, the real-time reporting system 106 utilizes event group identifiers to store the published event data. For example, in one or more implementations, the monitoring agent 130 utilizes unique event group identifiers to store corresponding published event map data. For instance, in various implementations, the monitoring agent 130 utilizes the unique event group identifier as a key value to index published data persisted to the distributed queue 502. In these implementations, the distributed queue 502 is a durable store (e.g., data is stored in both memory and disk).

In various implementations, the monitoring agent 130 utilizes the unique event group identifier as a routing key. For example, the monitoring agent 130 orders and/or groups the incoming data utilizing the unique event group identifier or a portion of it (e.g., the prefix or the suffix) as well as groups similar event groups together. In this manner, the real-time reporting system 106 is able to utilize the unique group event identifier as a semantic identifier to quickly retrieve a desired metric or event group or a set of similar event groups.

Additionally, in various instances, the monitoring agent 130 utilizes the unique event group identifier as a filtering key. For instance, the monitoring agent 130 utilizes the unique event group identifier to perform a duplication check to prevent the same data (e.g., multiple identical instances of a metric are received from the event data collector 120) from duplicate processing. In various implementations, the monitoring agent 130 utilizes the unique event group identifier to order characteristics of the received data, if structured in a time-series format, to depict and indicate at which point received data has been processed.

In some implementations, the monitoring agent 130 filters out previously processed event data to prevent duplicate processing. For example, if the monitoring agent 130 has read File 2 up to the offset of 100, if and published event data between 0-100 for File 2 is received (where File 2 is identified based on its unique event group identifier), the monitoring agent 130 filters out this data based on determining that the unique event group identifier (or a portion thereof) has already been processed. In this implementation, the monitoring agent 130 utilizes unique event group identifiers to improve efficiency by ensuring that event data is only processed once (based on filtering out copies of the data that have been previously processed). Indeed, in one or more implementations, the monitoring agent 130 ensures that the distributed queue 502 provides exactly one read of a piece of event data.

In various instances, the monitoring agent 130 processes the event data stored in the distributed queue 502. For example, in various implementations, the monitoring agent 130 dequeues data from the distributed queue 502 and processes it with the data processing service 504. As shown, the data processing service 504 includes the consumers 506 and the aggregators 508. In example implementations, the data processing service 504 processes data from the distributed queue in parallel to optimize processing. Additionally, in various implementations, the data processing service 504 utilizes the unique identities to process the published event data in the distributed queue 502.

In various implementations, the monitoring agent 130 provides dequeued data to one or more of the consumers and/or one or more of the aggregators 508. For example, the monitoring agent 130 utilizes the aggregators 508 to add, subtract, multiply, divide, merge, convert and/or perform other operations (e.g., map-reduce pattern or median determination or custom-defined events) to the consumer processed event data. In this manner, the monitoring agent 130 is able to reduce the number of network calls and requests to the various persistence stores (e.g., a queue or persistence store). Indeed, in various implementations, the monitoring agent 130 aggregates processed event data to reduce the number of write requests provided to the persistence store 150 (e.g., the processed event data forms another level of a hierarchical aggregation structure).

Additionally, in various implementations, the data processing service 504 (e.g., the aggregators 508) creates a network graph type of structure (e.g., a directed acyclic graph) for the processed event data. In various implementations, the real-time reporting system 106 adds one or more configurable aggregation frameworks (described below) as nodes in the network graph, which is stored in the persistence store 150.

In some instances, the monitoring agent 130 persists the processed event data to the persistence store 150. For example, in various implementations, the monitoring agent 130 generates a consumer event map 510 from processed event data (e.g., data processed by the consumer 506 and aggregated by the aggregators 508) and persists in the consumer event map 510 (e.g., processed data from the consumer event map) to the persistence store 150. For instance, the monitoring agent 130 generates a consumer event map 510 based on event groups (e.g., utilizing the unique event group identifiers) per service instance.

In various implementations, the real-time reporting system 106 creates processing markers to serve as checkpoints.

In some instances, the real-time reporting system 106 utilizes the processing markers to track which published event data has been read and/or processed to ensure that event data is efficiently processed (e.g., processed only once). Additionally, in various instances, the real-time reporting system 106 utilizes processing markers to restore lost processed event data in the event of a failure associated with an edge device.

To elaborate, in various implementations, the real-time reporting system 106 persists data to the persistence store 150. In connection with persisting processed event data, in some instances, the real-time reporting system 106 also creates a process marker that indicates what data has been processed (e.g., a checkpoint event to generate a process marker is triggered when data is persisted to the persistence store 150). When additional process data is persisted to the persistence store 150, in various instances, the real-time reporting system 106 generates and stores a new process marker. In various implementations, the process marker indicates the current or next key value to be processed, which helps the real-time reporting system 106 to process event data only once, even if instances of the same event data are received and read multiple times by the monitoring agent 130.

In additional implementations, the real-time reporting system 106 utilizes the process markers to recover lost data. For example, in the event of a crash by the event data collector 120 and/or the edge device, the real-time reporting system 106 utilizes a process marker to determine what processed event data has been added to the consumer event map. In this manner, the process marker serves as a checkpoint (e.g., a deduplication check) for filtering out duplicate events being inaccurately included in the consumer event map.

In various implementations, the real-time reporting system 106 process marker is stored to the persistence store 150 along with corresponding processed event data persisted to the persistence store 150. Additionally, in some implementations, the process marker indicates the last unique identifier (e.g., the "last unique identifier until") corresponding to data recently added to the persistence store 150. Indeed, when persisting the processed event data (e.g., raw data) to the persistence store 150 (e.g., key value store), in some instances, the monitoring agent 130 also persists the unique identifier (e.g., a process marker) for the event data.

As noted above, in various implementations, the persistence store 150 is edge-based and is implemented on the edge device that implements the real-time reporting system 106. In some implementations, the persistence store 150 is implemented within the same local network as the edge device. In various implementations, the persistence store 150 is cloud-based and implemented on a cloud computing system remote to the local system.

As shown, FIG. 5 also includes the configurable aggregation framework 512. Because the amount of event data at a given time can be vast, a user typically does not need real-time monitoring and reporting of every piece of event data. Accordingly, based on the configurable aggregation framework 512, in one or more implementations, the real-time reporting system 106 filters out the metrics that are not desired as well as frames the metrics that are of interest in such a way that the real-time reporting system 106 processes them more efficiently and more quickly.

In various implementations, the real-time reporting system 106 enables users to configure and/or define how the monitoring agent 130 processes published event data. For instance, the real-time reporting system 106 stores a modifiable schema registry within the persistence store 150 that the real-time reporting system 106 utilizes to determine how to process the published event data pulled from the distributed queue 502. In example implementations, the configurable aggregation framework 512 is maintained in a JSON, XML, or another file type.

In various implementations, the configurable aggregation framework 512 indicates threshold conditions that correspond to operations and functions performed by the data processing service 504. In one or more implementations, the configurable aggregation framework 512 provides instructions to the monitoring agent 130 on how to process data based on data sources of the published event data (e.g., raw entry data), aggregation functions, validation schemes, and output formats. In certain implementations, the real-time reporting system 106 facilitates executing multiple configurable aggregation frameworks (e.g., aggregation mechanisms) for the same entries (e.g., raw pieces of published data).

To elaborate, in one or more implementations, the real-time reporting system 106 reduces latency by employing configurable aggregation frameworks (e.g., automatic-configurable aggregations). In various implementations, a configurable aggregation framework has a schema registry that includes user-specified details and aggregation functions provided by the user. In various implementations, the monitoring agent 130 reads the raw entries in the distributed queue 502 to a consumer event map 510, utilizes one or more of the aggregate functions (if needed) to process the raw data, and persists the processed data to the persistence store 150. In some implementations, the monitoring agent 130 generates a final entry after the aggregation, which is persisted to the persistence store 150.

Additionally, in various implementations, when a new metric (e.g., event map data) is read, the monitoring agent 130 registers it with the schema registry. In these implementations, the schema registry provides a global registry for each service, edge device, or device group having monitored metrics. In this manner, the schema registry indicates dependencies between these metrics and the aggregation functions. Further, based on performing the aggregation functions indicated in the schema registry, the monitoring agent 130 generates a graph (e.g., a directed acyclic graph) where the aggregation functions are vertexes that define data flow and dependencies.

As additional information, in various implementations, the monitoring agent 130 utilizes a periodic scanner to list the raw entries from the distributed queue 502 and pass them to the aggregators 508 to manage a list of aggregation job graphs (e.g., created graphs). For example, the monitoring agent 130 generates an intermediatory key after aggregation and persists the intermediatory key to the persistence store 150. Then, the monitoring agent 130 reads the intermediatory key from the persistence store 150 and/or utilizes the intermediatory key as input for the next aggregation set in the job graph. In various implementations, the monitoring agent 130 processes tasks in batches and/or runs them in parallel bounded by a service thread pool. In example implementations, the monitoring agent 130 passes input key/values to the aggregators 508 to form the final key values. In the case of one or more of the aggregators 508 utilizing a multi-node (e.g., multi-stage) job, the entries processed from one intermediate stage are further passed to the next aggregation job, when necessary.

Further, in various implementations, during one or more states of processing aggregating event data, the monitoring agent 130 removes raw entries, and the intermediate entries are persisted in the persistence store 150. In example implementations, the monitoring agent 130 ensures that entries in the consumer event map 510 are associated with the time series format.

As shown, FIG. 5 also includes the validator 514. In various implementations, the validator 514 determines when one or more conditions are satisfied and, in response, provides a corresponding indication. For instance, in one or more implementations, the validator 514 identifies one or more validation rules (e.g., policies) that are verified against the received metrics. When the metrics trigger one of the validation rules, the validator 514 generates an indication that the validation rule has been met.

To illustrate, as an example, a validation rule includes generating an alert when the storage capacity of an edge device reaches 80%. For instance, the validator 514 registers a listener that monitors for the specified validation rule being met. When the threshold is met, the validator 514 generates an alert. In some instances, the validator 514 publishes the alert to the distributed queue, which is recognized by the data processing service 504 when dequeuing and processing data.

In various implementations, the validator 514 is an aggregation-based validator that checks for validation rules being met on or after the aggregators 508. Then, the validator 514 generates and publishes an alert to the distributed queue 502 and one or more of the consumers 506 detects (e.g., "listens") for the alert. In response to detecting an alert, the distributed queue provides the alert (or another indication) to a user client device (e.g., via an electronic message or a graphical user interface popup).

In some implementations, the real-time reporting system 106 provides an interactive interface for users to add, modify, and/or remove validation rules. For example, validation rules are configurable regarding how to monitor metrics and/or provide alerts to a user client device. In this manner, the real-time reporting system 106 facilitates monitoring compliance-related conditions. Additionally, in some implementations, the validation rules indicate an action to be performed upon a validation rule being met. Further, in various implementations, the real-time reporting system 106 adds validation rules to a schema registry and/or as a node within the directed acyclic graph, which is a type of network graph.

As also shown, FIG. 5 also includes retention policies 516 associated with the persistence store 150. In various implementations, the real-time reporting system 106 generates retention policies 516 with respect to retaining, storing, and/or removing data. For example, the retention policies 516 indicate a configurable time for removing stored data, and the real-time reporting system 106 scans data in the persistence store 150 (e.g., periodically) and determines if a corresponding marker or timestamp for an entry is beyond a retention policy (e.g., checks the staleness of an entry). If so, the real-time reporting system 106 removes the data from the table or database and/or archives the data. In addition, in various instances, the real-time reporting system 106 removes the stale maker entries.

In some implementations, the retention policies 516 are added to the schema registry. For instance, the retention policies 516 are added as a node to the directed acyclic graph. Further, in various implementations, the retention policies 516 are located on the persistence store 150, as shown. In some implementations, the retention policies 516 are located on the edge device or otherwise within the edge-based local network. Additionally, in some implementations, while scanning data in the persistence store 150, the real-time reporting system 106 removes data in the persistence store 150 when a metric is determined to be non-compliant.

Figure 6:
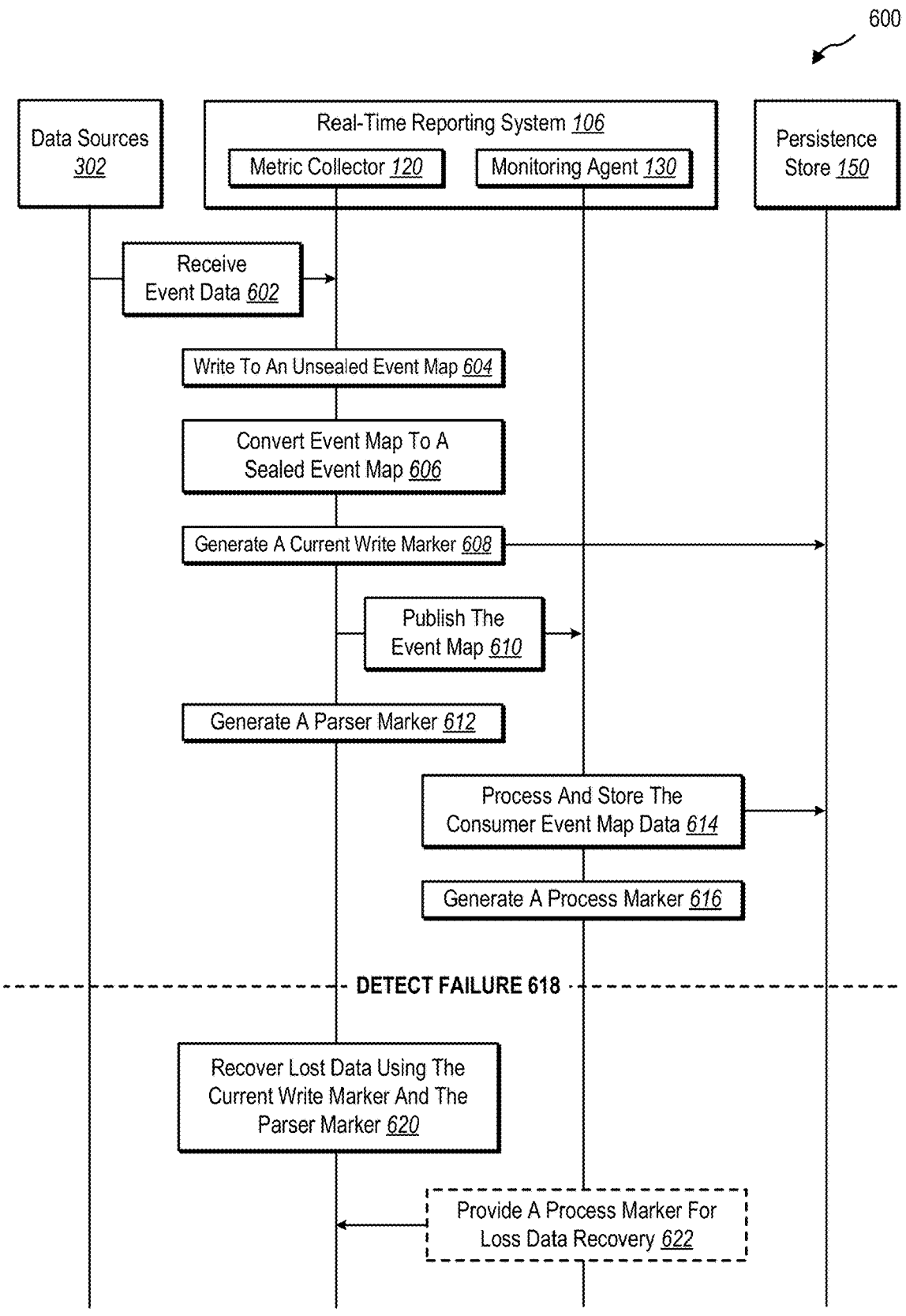
FIG. 6 illustrates a sequence diagram of an example method of establishing and utilizing fallback markers to protect against edge device failures in accordance with one or more implementations.

Turning now to the next figure, FIG. 6 illustrates a sequence diagram of establishing and utilizing fallback markers to protect against edge device failures in accordance with one or more implementations. As shown, FIG. 6 includes a series of acts 600 performed by the real-time reporting system 106 (e.g., the event data collector 120 and the monitoring agent 130) with respect to the local data sources 302 and the persistence store 150.

As shown, the series of acts 600 includes an act 602 of receiving event data. For example, the event data collector 120 receives event data from one of the local data sources 302, as provided above. In response, as described above, in various implementations, the event data collector 120 writes to an unsealed event map, as shown in the act 604. Further, as described above, the event data collector 120 converts the event map to a sealed event map, as shown in the act 606. For example, when the event map triggers a threshold condition, the event data collector 120 seals the event map and adds it to an in-memory queue.

As also shown, the series of acts 600 includes an act 608 of the event data collector 120 generating a current write marker. For example, the event data collector 120 generates a current write marker when a service log rotates to a new unsealed service or when a database journal rotation occurs. In this manner, the current write marker indicates the current service log or journal page where data has been written.

In some implementations, the current write marker indicates the current position of data being written to an active and/or unseeable event map. In various implementations, the current write marker is persisted in the persistence store 150. For instance, the current write marker indicates the event map name (e.g., file or log name or identifier) to which event data has been written. In this manner, the real-time reporting system 106 maintains bookkeeping information that indicates the current place where received event data is being written to the in-memory queue.

For example, for a single-node system or a non-partition database, the current write marker indicates that the node is writing to journal J1 to depict exactly where the write is happening. In other cases, the current write marker indicates when writes move to a different journal page, such as journal J3, etc. Then, when the event data collector 120 is collecting event information, it knows where the data is written and periodically sends updates (e.g., when a rotation occurs) to the persistence store 150.

As shown, the series of acts 600 includes an act 610 of publishing the event map. For example, the event data collector 120 publishers the event map from the in-memory queue to a distributed queue belonging to the monitoring agent 130, as described previously. In connection with publishing the event map, the event data collector 120 generates a parser marker, as shown in the act 612. In this manner, the parser marker serves as a publication marker or indicator that indicates up to which point event data has been published to the distributed queue. Indeed, the parser marker serves as a checkpoint that indicates the latest offset position of published event data.

As shown, the series of acts 600 includes an act 614 of processing and storing consumer event map data. For instance, as described above, the monitoring agent 130 processes event data from published event maps (e.g., as published event data) and stores it in the persistence store 150. In connection with persisting the processed event map data, the real-time reporting system 106 generates a process marker. To illustrate, the monitoring agent 130 generates a process marker, as shown in act 616.

In various implementations, a process marker indicates, on the monitoring agent 130, up to what point data has been published. As shown below, the real-time reporting system 106 utilizes the process marker as a redundant fallback mechanism to recover lost data. Additionally, in some instances, the monitoring agent 130 utilizes the process marker as a deduplication check to endure that data is not being reprocessed.

As shown, the series of acts 600 includes an act 618 of detecting a failure. For example, the real-time reporting system 106 detects a failure at the edge device, a restarted service, and/or elsewhere in the environment. In some instances, the failure results in event data, which is stored in the in-memory queue, becoming lost. As a result, the real-time reporting system 106 cannot process this data without first recovering it. Fortunately, as described below, the real-time reporting system 106 utilizes the markers to implement a fallback mechanism for recovering lost data in such events as these.

To illustrate, the series act acts includes an act 620 of the real-time reporting system 106 recovering lost data using the current write marker and the parser marker. In various implementations, upon detecting a failure that results in the loss of event data, the real-time reporting system 106 initiates a general parser by the event data collector 120 to recover lost data. In some implementations, the parser runs at fixed intervals per service and/or per database partition to discover the delta (e.g., change) that has not been published by the event data collector 120 due to the failure.

In various implementations, the parser parses the event maps (e.g., service logs/database partitions) to identify a parser marker (e.g., a minimum limit in time) indicating the point to which event data has been published. Then, the event data collector 120 utilizes the parser to start reading from that point. In addition, the event data collector 120 identifies a current write marker indicating the last event map to be written (e.g., a maximum limit in time). In this manner, the real-time reporting system 106 performs data filtering on the event data collector 120 (e.g., a publisher side) to filter out previously published data from being re-published to the monitoring agent 130, which efficiently prevents duplicate processing on the monitoring agent 130 (rather than performing filtering on the monitoring agent 130, which is less efficient).

To elaborate, the general parser mechanism implemented by the real-time reporting system 106 is a fallback mechanism that it parses entries of event data on the event data collector 120 to ensure that no events are missed in the instance of a detected failure. Accordingly, the real-time reporting system 106 utilizes current write markers and parser markers. As noted above, the current write markers define a maximum limit in time, meaning the farthest back point in time at which the parsing happens at an instance of time. This is because, in various instances, current write markers are generated behind the thread publisher 412 and indicate the last set of event maps (e.g., service logs or database journals) that were written to be published (but that possibly have not been published). Additionally, this indicates event data that was possibly lost in the in-memory queue when it was lost due to the detected failure.

In addition, the real-time reporting system 106 identifies parser markers. As noted above, a parser marker stays behind publications of the event data collector 120 and indicates event data that has been published. In this manner, parser markers maintain the current positions of what event data has been published up to a current offset. Accordingly, in many implementations, a parser marker indicates the minimum starting point (e.g., the closest position in time) for the parser to identify lost event data. Thus, in various implementations, the current write marker and the parser marker together form a window of a minimum starting point (e.g., the parser marker) and a maximum point (e.g., the current write marker) that the parser travels to recover lost event data.

In some implementations, in recovering lost event data, the parser checks stored files to determine if it has a current write marker. If no current write marker is present, the parser gets the last raw entry that was published for the file, which includes the offset from which the event data needs to be published. Additionally, the parser parses the event data from the offset to the end of the file, which sometimes includes publishing the event data to the distributed queue for further processing, as described above. In some instances, once a file is processed, the parser updates a parser checkpoint marker that serves quickly look up the position from where the parser should start in case of a process crash or the next set of iterations.

As noted above, the real-time reporting system 106 provides real-time functionality to monitor and report incoming event data (e.g., created by in-memory processing). In some implementations where the fallback mechanism is implemented, adding markers and accounting for data lost periodically introduces slight delays, resulting in near real-time performance. In either case, when event data is published for aggregation, it is made available for immediate consumption, which reduces processing latency.

As shown, the series of acts 600 includes an act 622 of providing the process marker for lost data recovery. In some instances, the real-time reporting system 106 needs additional information and/or assistance in recovering lost data. Accordingly, the real-time reporting system 106 utilizes process markers, which reside on the monitoring agent 130 and indicate up to what point published event data has been received. For instance, the monitoring agent 130 provides the process marker to the event data collector 120 to indicate the last received piece of published event data.

For example, for a file that includes event data from 0-1000, if there is some event data loss between where the process marker is and where the published event data has occurred (e.g., the process marker is at an offset of 200 and the last published position is as at an offset of 300), in various instances, the real-time reporting system 106 provides the data offset of 200 to the event data collector 120 to begin republishing data at an offset of 200. In this example, the real-time reporting system 106 may perform some duplicate handling of event data at the distributed queue when reading data events from the offset of 200-300, but the data processing service detects and filters out these kinds of data events to prevent duplicate handling of event data (e.g., data is only processed once).

In various implementations, such as in the case of limited memory edge devices (e.g., memory constrained edge devices) the real-time reporting system 106 adds a persistence store that includes a log-structured merge tree (e.g., an LSM) to facilitate lightweight writing and reading of event data as part of the event data publishing process. In these implementations, the LSM includes a journal log, memory table, and tree structure (e.g., a B+ tree structure). Additionally, in these implementations, the persistence store includes a write and read optimized store that stores the event data in a time series format and the event data from the event map persists to the persistence store along with the unique event group identifier. In additional implementations, the real-time reporting system 106 further aggregates this event data to create a final entry, which is used by an administrator or user for consumption.

Additionally, in certain implementations, for edge devices in disconnected mode, the real-time reporting system 106 leverages the framework described above to obtain the monitoring information. For example, the aggregated data written to the journal files are persisted to the distributed queue and instead of sending raw data, the aggregated data is sent to a cloud monitoring service for further processing. In this manner, the real-time reporting system 106 provides a multi-level aggregation mechanism while, at the same time, provides access to monitoring information for users in a consumable format when an edge device gets disconnected. Further, the multi-level aggregation helps in optimizing the aggregation as less data is sent to the cloud for further processing.

Figure 7:
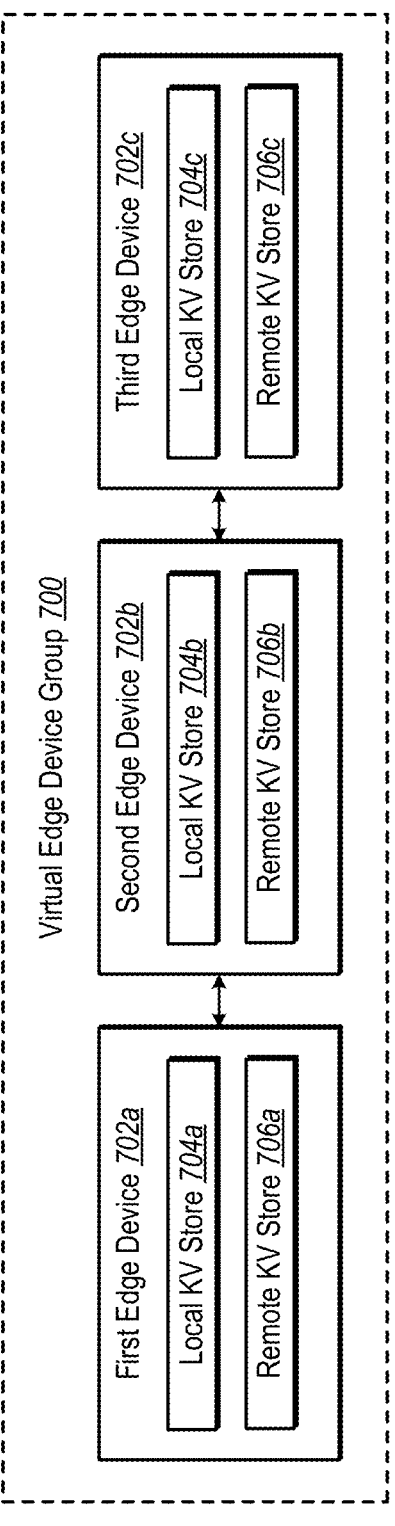
FIG. 7 illustrates a diagram of an example method of utilizing a virtual edge device group to protect against edge device loss in accordance with one or more implementations.

FIG. 7 illustrates a block diagram of utilizing a virtual edge device group to protect against edge device loss in accordance with one or more implementations. In various implementations, the real-time reporting system 106 utilizes virtual edge device groups to provide streamlined monitoring by grouping edge devices in the same network together to be monitored as a group. To illustrate, FIG. 7 shows a virtual edge device group 700 that includes a first edge device 702a, a second edge device 702b, and a third edge device 702c. The virtual edge device group 700 can include fewer or additional edge devices.

As noted above, in one or more implementations, the real-time reporting system 106 forms a virtual edge device group from multiple devices (but not formed into a cluster). For example, each floor of a multi-floor building is formed into a group to monitor data usage of each floor. As provided below, a virtual edge device group provides high availability, fault tolerance, and durability by grouping multiple edge devices into a single virtual unit.

Additionally, in various instances, each of the edge devices includes multiple persistence stores including a local KV (key value) store as well as one or more remote KV stores. To illustrate, the first edge device 702a includes a first local KV store 704a and a first remote KV store 706a, the second edge device 702b includes a second local KV store 704b and a second remote KV store 706b, and the third edge device 702c includes a third local KV store 704c and a third remote KV store 706c.

In one or more implementations, within the virtual edge device group 700, the real-time reporting system 106 designates one of the devices as a primary edge device. When the event data is provided from a data source to the virtual edge device group 700, one of the edge devices (e.g., the primary) processes the data and persists it to its local KV store. In various implementations, the primary edge device also persists the data to the remote KV store of the secondary devices.

For example, the real-time reporting system 106 writes for all events corresponding to the first edge device 702a in the first local KV store 704a. Additionally, the real-time reporting system 106 replicates the processed event data to the second remote KV store 706b and the first remote KV store 706a. Indeed, in connection with writing and persisting event data locally, the real-time reporting system 106 also stores redundant copies of the event data remotely, but still within the same local network. In this manner, the real-time reporting system 106 provides redundancy protection if one of the edge devices in the virtual edge device group crashes and loses data. Further, the redundant event data backup provides high availability when one or more of the edge devices are disconnected from the cloud.

In various implementations, when a virtual edge device group (a virtual group) is created, the real-time reporting system 106 creates the different persistence stores in each edge device. In some implementations, the persistence store is an LSM-based structure, as noted above.

In one or more implementations, the real-time reporting system 106 writes event data to an event map stored on the in-memory queue (e.g., an in-memory table). In some instances, the real-time reporting system 106 creates and stores a replicator thread that replicates the local KV store journal to the remote KV stores on other devices in the virtual edge device group. For example, each device that receives the replicated KV store journal replays it to persist the data in its remote KV stores. In one or more instances, to recover data, the real-time reporting system 106 replays data from the local KV store journal from the secondary edge devices from their remote KV stores in sequential order.

Figure 8:
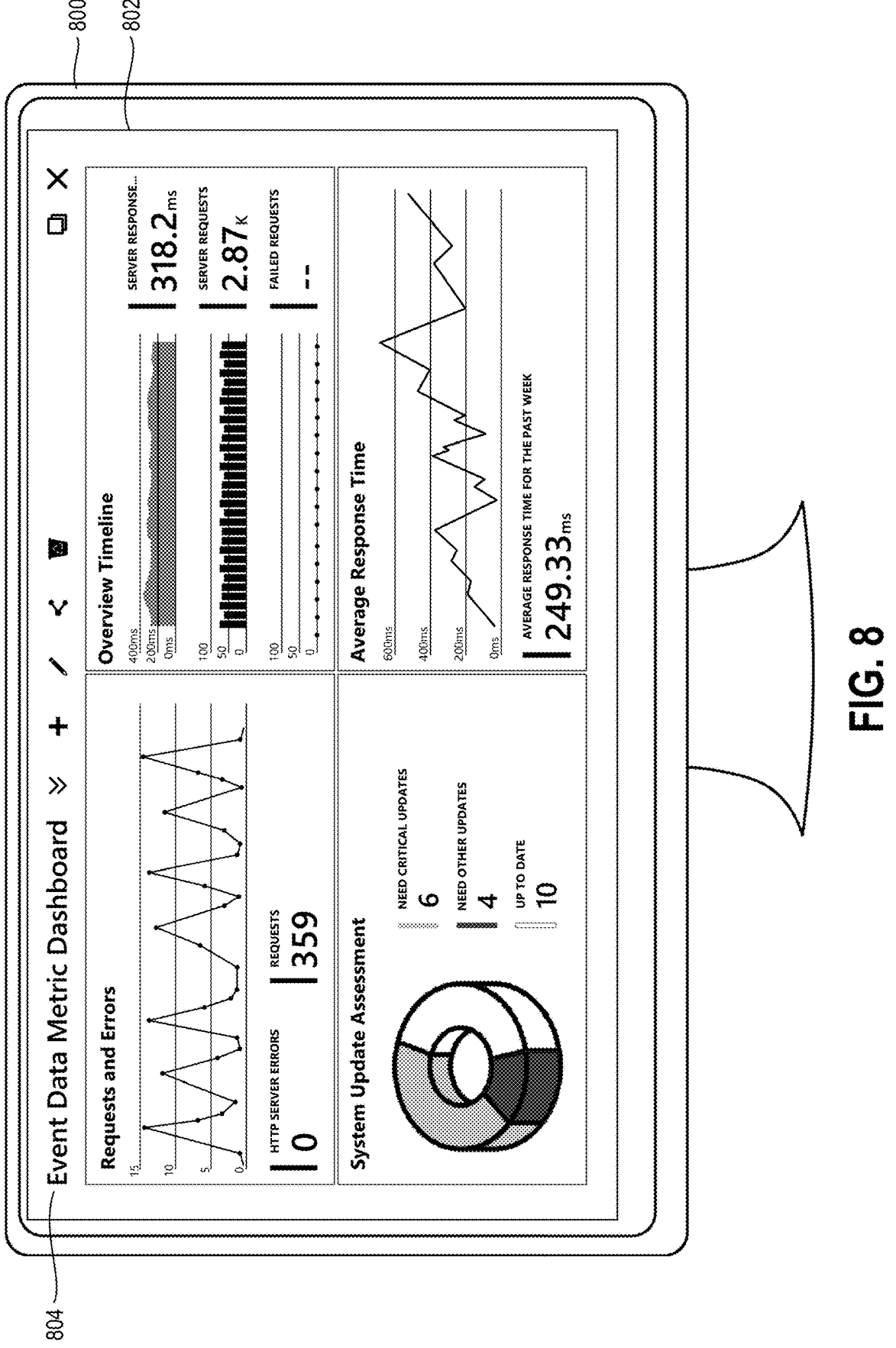
FIG. 8 illustrates an example graphical user interface that displays an event data report based on persisted processed event data in accordance with one or more implementations.

FIG. 8 illustrates a graphical user interface that displays an event data metric report based on persisted processed event data in accordance with one or more implementations. As shown, FIG. 8 includes a computing device 800 having a graphical user interface 802, which shows an event data metric dashboard 804. In various implementations, the real-time reporting system 106 provides the event data metric dashboard 804 in response to a request to view event data metrics for devices in a local network. In some implementations, the real-time reporting system 106 provides live, real-time updates of the event data metric dashboard 804.

As shown, the event data metric dashboard 804 includes real-time metric reports for one or more metrics. While some event data metric reports are shown, in some instances, the event data metric dashboard 804 includes additional, fewer, or different reports. For example, the event data metric dashboard 804 includes the current capacities of an edge device.

In various implementations, the event data metric dashboard 804 is an interactive interface that facilitates user interactions. For instance, the event data metric dashboard 804 enables a user to select a report to view more detailed information regarding the report. In some implementations, the event data metric dashboard 804 provides search functionality. In certain implementations, the event data metric dashboard 804 includes interactive elements and an interface for a user to interact with a configurable aggregation framework. In one or more implementations, the event data metric dashboard 804 includes any number of interactive interface elements.

Figure 9:
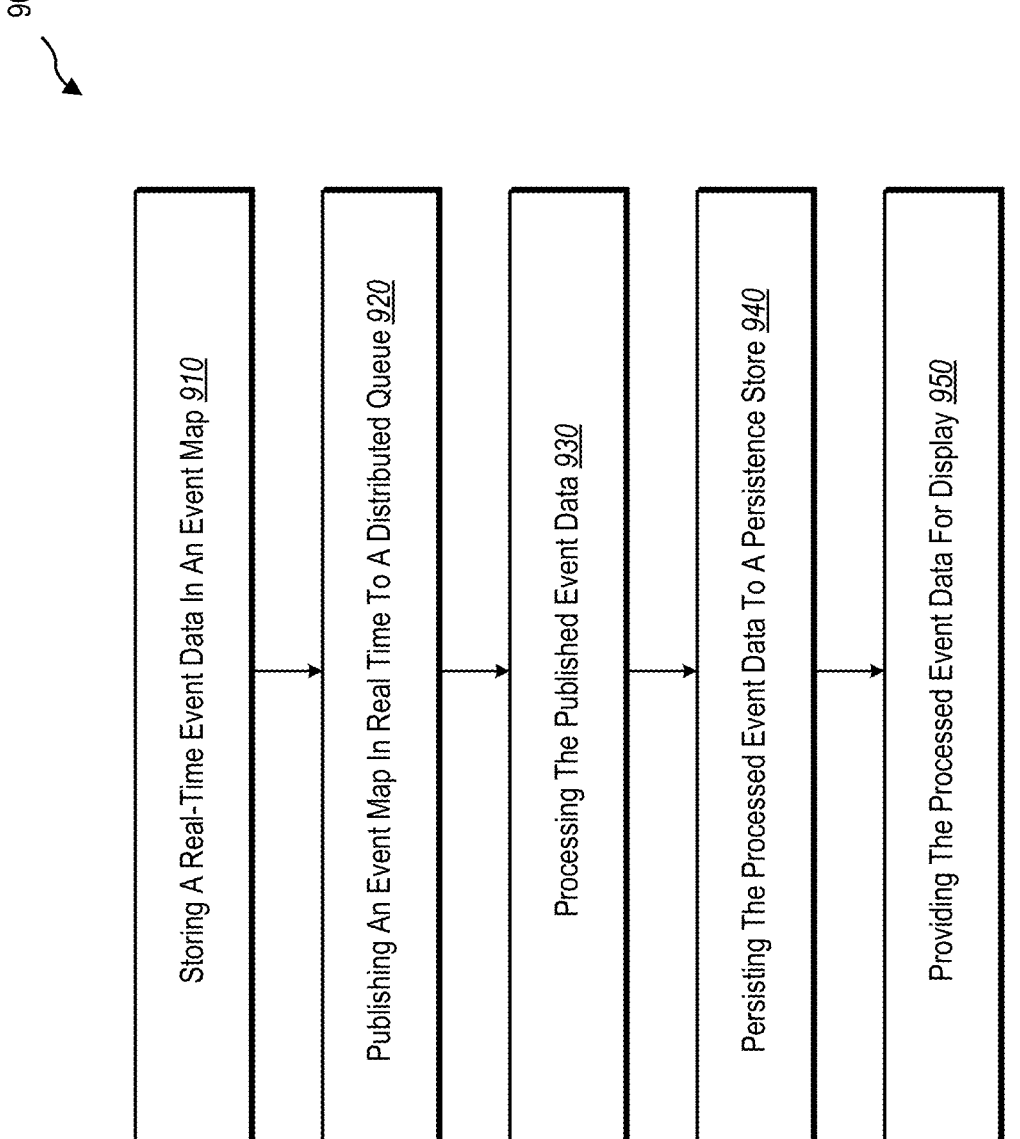
FIG. 9 illustrates an example series of acts for persisting monitored and processed event data to a persistence store in accordance with one or more implementations.

Turning now to FIG. 9, this figure illustrates an example flowchart that includes a series of acts 900 for utilizing the real-time reporting system 106 in accordance with one or more implementations. In particular, FIG. 9 illustrates an example series of acts for persisting monitored and processed event data to a persistence store in accordance with one or more implementations. While FIG. 9 illustrates acts according to one or more implementations, alternative implementations may omit, add to, reorder, and/or modify any of the acts shown. Further, the acts of FIG. 9 can be performed as part of a method (e.g., a computer-implemented method). Alternatively, a non-transitory computer-readable medium can include instructions that, when executed by one or more processors, cause a computing device to perform the acts of FIG. 9. In still further implementations, a system (e.g., a processing system comprising a processor) can perform the acts of FIG. 9.

As shown, the series of acts 900 includes an act 910 of storing real-time event data in an event map. For instance, in example implementations, the act 910 involves detecting, in real time, event data be written to an event record, the event data is generated by a data source and storing, within non-persistent memory and in real time, a copy of the event data in an event map that belongs to an event group. In various implementations, the act 910 includes writing the event data to an unsealed event map. In some implementations, the act 910 includes rotating, within the event group, the unsealed event map into a sealed event map that is a non-writable map upon a fullness event map threshold being satisfied and storing the sealed event map in an in-memory queue within the non-persistent memory. In various implementations, the data source is located with a local network in which the edge device also resides. In various implementations, the local network is isolated from public networks.

As further shown, the series of acts 900 includes an act 920 of publishing an event map in real time to a distributed queue. For instance, in example implementations, the act 920 involves publishing, in real time, the event map with a unique identifier to a distributed queue as published event data. In various implementations, the published event data is published to a distributed queue utilizing a unique event group identifier as a key value. In some implementations, a unique event group identifier includes a fixed prefix based on the data source and a variable suffix including a time-stamp based on when the event data was generated.

As further shown, the series of acts 900 includes an act 930 of processing the published event data. For instance, in example implementations, the act 930 involves generating processed event data by processing the published event data based on the unique identifier. In one or more implementations, the act 930 includes generating the processed event data by utilizing a data processing service (e.g., consumers and data aggregators) to generate the processed event data.

As further shown, the series of acts 900 includes an act 940 of persisting the processed event data to a persistence store. For instance, in example implementations, the act 940 involves persisting the processed event data to a consumer event map within a persistence store. In some implementations, the processed event data is persisted to the persistence store utilizing the unique identifier as a key. In additional implementations, the consumer event map is a key value store, and the consumer event map stores the processed event data utilizing the fixed prefix of the unique identifier as a key.

In example implementations, the persistence store is located within an edge device with the same local network as the data source (e.g., local devices in the local network that provide event data). In one or more implementations, the act 940 includes providing the consumer event map to a locally-connected edge device that is disconnected from a public internet connection. In some implementations, the act 940 includes providing the consumer event map to a cloud computing system external to a local network.

As further shown, the series of acts 900 includes an act 950 of providing the processed event data for display. For instance, in example implementations, the act 950 involves providing the processed event data from the consumer event map for display.

In some implementations, the series of acts 900 includes additional acts. For example, in certain implementations, the series of acts 900 includes acts of generating a current write marker in response to rotating the unsealed event map for the sealed event map. In some instances, the current write marker is stored on the persistence store. In various implementations, the series of acts 900 also includes an act of generating a parser marker in response to publishing the event map to the distributed queue. In some instances, the parser marker indicates that the event map has been published to the distributed queue. In certain implementations, the series of acts 900 also includes determining a memory failure in the non-persistent memory that causes event data to be lost and recovering lost event data based on parsing copies of event data between the current write marker to the parser marker.

In various implementations, the series of acts 900 includes acts of detecting, in real time, event data to be written to a service log of a file system, the event data is generated by a service or detecting, in real time, event data from a service; storing, within an in-memory queue and in real time, a copy of the event data in an event map that belongs to an event group, where storing the event data occurs before writing the event data to the service log, or storing, in real time, the event data in an event map belonging to an event group in an in-memory queue by writing the event data to an unsealed event map; publishing, in real time, the event map with a unique event group identifier to a distributed queue as published event data; generating processed event data by processing the published event data based on the unique event group identifier; generating aggregated processed event data by aggregating the processed event data; persisting the aggregated processed event data to a consumer event map within a persistence store; and providing the aggregated processed event data from the consumer event map for display.

In one or more implementations, the series of acts 900 includes acts of detecting the event data to be written to the service log by embedding an event data collector into the service to detect the event data as it is received from the service. In some implementations, the series of acts 900 also includes storing the event data in the event group by utilizing the event data collector to store the event data into an unsealed event map within the event group and maintaining an in-memory queue that includes one or more sealed event maps having copies of previously received event data generated by the service. In various implementations, the series of acts 900 includes publishing the event data utilizing the event data collector by dequeuing event data from the in-memory queue and writing the event data dequeued from the in-memory queue to the distributed queue based on a unique event group identifier.

In some implementations, the series of acts 900 includes acts of detecting, in real time, event data to be written to a database journal of a file system, the event data is generated by one or more services or detecting, in real time, event data from a service; storing, within non-persistent memory and in real time, a copy of the event data in an event group including an event map, where storing the event data occurs after writing the event data to the database journal and before writing the event data to a database index corresponding to the database journal; publishing, in real time, the event map with a unique identifier to a distributed queue as published event data; generating processed event data by processing the published event data based on the unique identifier; and persisting the processed event data to a consumer event map within a persistence store.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the real-time reporting system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 10:
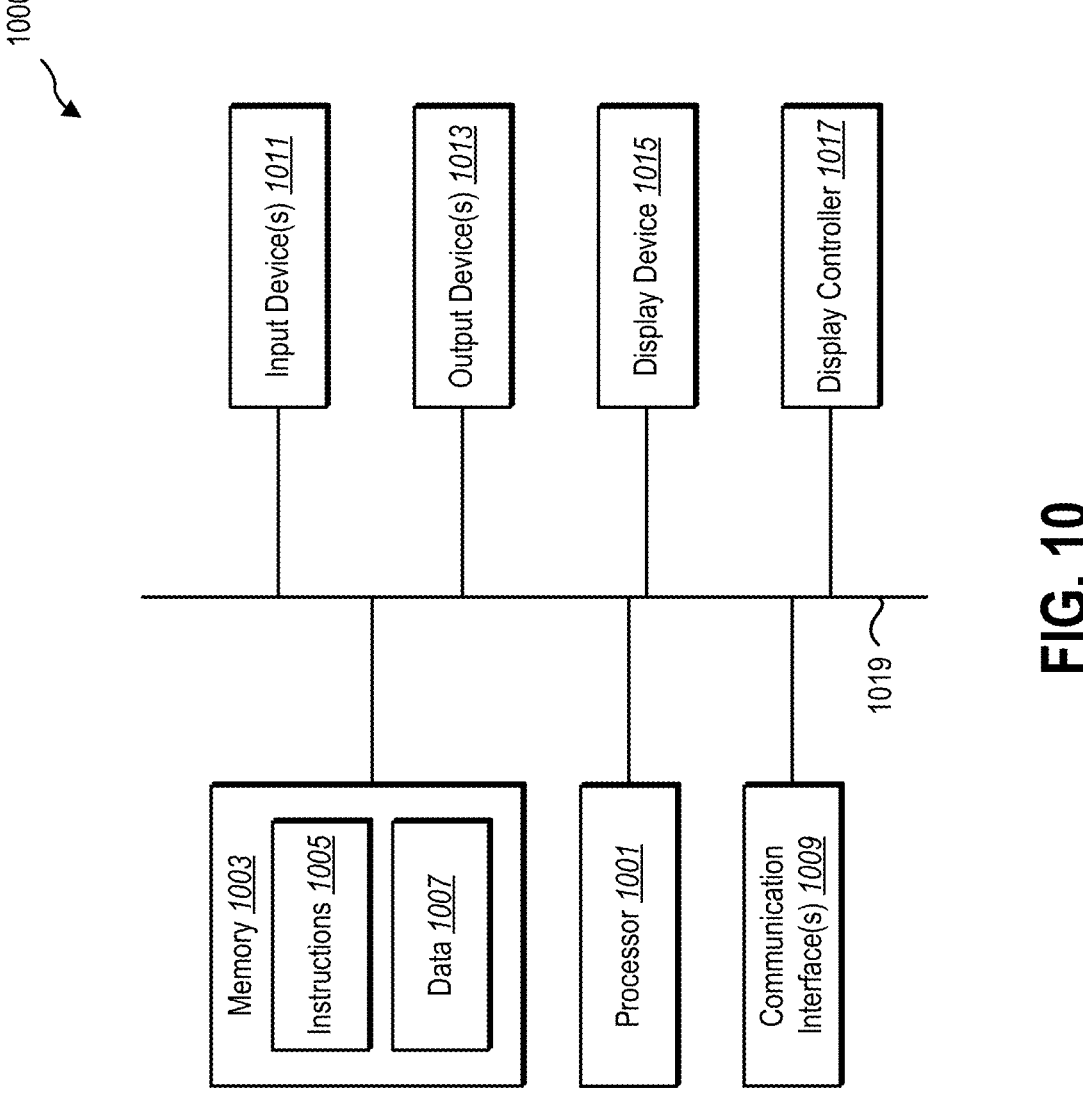
FIG. 10 illustrates example components included within a computer system.

FIG. 10 illustrates certain components that may be included within a computer system 1000. The computer system 1000 may be used to implement the various computing devices, components, and systems described herein. As used herein, a "computing device" refers to electronic components that perform a set of operations based on a set of programmed instructions. Computing devices include groups of electronic components, client devices, sever devices, etc.

In various implementations, the computer system 1000 may represent one or more of the client devices, server devices, or other computing devices described above. For example, the computer system 1000 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1000 includes a processor 1001. The processor 1001 may be a general-purpose single- or multi-chip microprocessor (e.g., an Advanced Reduced Instruction Set Computer (RISC) Machine (ARM)), a special purpose microprocessor (e.g., a digital signal processor (DSP)), a microcontroller, a programmable gate array, etc. The processor 1001 may be referred to as a central processing unit (CPU). Although the processor 1001 shown is just a single processor in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1005 and the data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during the execution of the instructions 1005 by the processor 1001.

A computer system 1000 may also include one or more communication interface(s) 1009 for communicating with other electronic devices. The one or more communication interface(s) 1009 may be based on wired communication technology, wireless communication technology, or both. Some examples of the one or more communication interface(s) 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computer system 1000 may also include one or more input device(s) 1011 and one or more output device(s) 1013. Some examples of the one or more input device(s) 1011 include a keyboard, mouse, microphone, remote control device, button, joystick, trackball, touchpad, and light pen. Some examples of the one or more output device(s) 1013 include a speaker and a printer. A specific type of output device that is typically included in a computer system 1000 is a display device 1015. The display device 1015 used with implementations disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for real-time monitoring and reporting, the computer-implemented method comprising:

storing event data received in an event map in non-persistent memory by:

writing the event data to an unsealed event map;

rotating, within an event group, the unsealed event map into a sealed event map upon a fullness event map threshold being satisfied; and storing the sealed event map in an in-memory queue within the non-persistent memory;

publishing the event map as part of the event group with a unique event group identifier to a distributed queue as published event data;

generating processed event data on an edge computing device by processing the published event data based on the unique event group identifier;

persisting the processed event data to a consumer event map within a persistence store of the edge computing device; and providing the processed event data from the consumer event map for display.

2. The computer-implemented method of claim 1, wherein the sealed event map is a non-writable map.

3. The computer-implemented method of claim 2, wherein storing the event data comprises storing the event map in the non-persistent memory on the edge computing device of a local network, wherein the edge computing device serves as an intermediary device between local computing devices in the local network and a cloud computing system.

4. The computer-implemented method of claim 1, further comprising generating a current write marker in response to rotating the unsealed event map for the sealed event map, wherein the current write marker is stored on the persistence store.

5. The computer-implemented method of claim 4, further comprising generating a parser marker in response to publishing the event map to the distributed queue, wherein the parser marker indicates that the event map has been published to the distributed queue.

6. The computer-implemented method of claim 5, further comprising:

determining a memory failure in the non-persistent memory that causes the event data to be lost; and recovering lost event data based on parsing copies of the event data between the current write marker to the parser marker.

7. The computer-implemented method of claim 1, wherein:

the published event data is published to the distributed queue utilizing the unique event group identifier as a key value of a key; and the processed event data is persisted to the persistence store utilizing the unique event group identifier as the key.

8. The computer-implemented method of claim 1, wherein the unique event group identifier is generated based on a local data source or service that generated the event data.

9. The computer-implemented method of claim 1, wherein the unique event group identifier comprises:

a fixed prefix based on a data source that generated the event data; and a variable suffix comprising a timestamp based on when the event data was generated.

10. The computer-implemented method of claim 9, wherein:

the consumer event map is a key value store; and the consumer event map stores the processed event data utilizing the fixed prefix of the unique event group identifier as a key.

11. The computer-implemented method of claim 1, wherein generating the processed event data comprises utilizing a data processing service and a data aggregator to generate the processed event data.

12. The computer-implemented method of claim 1, wherein the persistence store is located within a same local network as a data source that generated the event data.

13. The computer-implemented method of claim 1, wherein persisting the processed event data to the consumer event map within the persistence store comprises providing the consumer event map to a locally-connected edge computing device that is disconnected from a public internet connection.

14. The computer-implemented method of claim 1, wherein persisting the processed event data to the consumer event map within the persistence store of the edge computing device comprises providing the consumer event map to a cloud computing system external to a local network.

15. A computer-implemented method for real-time monitoring and reporting, the computer-implemented method comprising:

detecting event data from a service;

storing the event data in an event map belonging to an event group in an in-memory queue by:

writing the event data to an unsealed event map;

rotating, within an event group, the unsealed event map into a sealed event map upon a fullness event map threshold being satisfied; and storing the sealed event map in the in-memory queue within non-persistent memory;

publishing the event map with a unique event group identifier to a distributed queue as published event data;

generating processed event data by processing the published event data based on the unique event group identifier;

generating aggregated processed event data by aggregating the processed event data;

persisting the aggregated processed event data to a consumer event map within a persistence store of an edge computing device; and providing the aggregated processed event data from the consumer event map.

16. The computer-implemented method of claim 15, wherein storing the event data comprises storing the sealed event map in the in-memory queue within non-persistent memory of the edge computing device.

17. The computer-implemented method of claim 15, wherein:

detecting, at the edge computing device of a local network, the event data comprises embedding an event data collector into the service to detect the event data as it is received from the service, wherein the edge computing device serves as an intermediary device between local computing devices in the local network and a cloud computing system; and storing the event data in the event group comprises:

utilizing the event data collector to store the event data into the unsealed event map within the event group; and maintaining the in-memory queue that comprises a sealed event map having copies of previously received event data generated by the service.

18. The computer-implemented method of claim 17, wherein publishing the event data utilizing the event data collector comprises:

dequeuing the event data from the in-memory queue; and writing the event data dequeued from the in-memory queue to the distributed queue based on the unique event group identifier.

19. A system for real-time monitoring and reporting, the system comprising:

a processing system; and a computer memory comprising instructions that, when executed by the processing system, cause the system to:

detect event data from a service;

store a copy of the event data in an event group comprising an event map in non-persistent memory by:

writing the event data to an unsealed event map;

rotating, within the event group, the unsealed event map into a sealed event map upon a fullness event map threshold being satisfied; and storing the sealed event map in an in-memory queue within the non-persistent memory;

publish the event map with a unique event group identifier to a distributed queue as published event data;

generate processed event data by processing the published event data based on the unique event group identifier; and persist the processed event data to a consumer event map within a persistence store of the edge computing device.

20. The system of claim 19, wherein detecting the event data from the service occurs at the edge computing device of a local network, wherein the edge computing device serves as an intermediary device between local computing devices in the local network and a cloud computing system.

* * * * *